(12) United States Patent
Tsai et al.

(10) Patent No.: US 7,906,189 B2
(45) Date of Patent: Mar. 15, 2011

(54) HEAT TRANSFER LABEL FOR FABRIC WITH THERMOCHROMIC INK AND ADHESIVE SURFACE ROUGHNESS

(75) Inventors: Kuolih Tsai, Arcadia, CA (US); Dong-Tsai Hseih, Arcadia, CA (US); Li Shu, Arcadia, CA (US); David N. Edwards, Arcadia, CA (US); Alan Morgenthau, Keene, NH (US); Yi-Hung Chiao, Temple City, CA (US); Xiao-Ming He, Arcadia, CA (US); Yukihiko Sasaki, Claremont, CA (US); Scott Wayne Ferguson, Sunnyvale, CA (US)

(73) Assignee: Avery Dennison Corporation, Pasadena, CA (US)

( * ) Notice: Subject to any disclaimer, the term of this patent is extended or adjusted under 35 U.S.C. 154(b) by 955 days.

(21) Appl. No.: 10/537,193

(22) PCT Filed: Dec. 2, 2003

(86) PCT No.: PCT/US03/38315
§ 371 (c)(1),
(2), (4) Date: Sep. 18, 2006

(87) PCT Pub. No.: WO2004/050262
PCT Pub. Date: Jun. 17, 2004

(65) Prior Publication Data
US 2007/0009732 A1    Jan. 11, 2007

Related U.S. Application Data

(60) Provisional application No. 60/430,216, filed on Dec. 2, 2002, provisional application No. 60/453,661, filed on Mar. 11, 2003.

(51) Int. Cl.
*B41M 5/40* (2006.01)

(52) U.S. Cl. ................. 428/32.77; 428/32.6; 428/32.78; 428/32.8; 428/32.81; 428/32.83; 428/913; 428/914

(58) Field of Classification Search ........................ None
See application file for complete search history.

(56) References Cited

U.S. PATENT DOCUMENTS
3,359,127 A    12/1967    Meyer et al.
(Continued)

FOREIGN PATENT DOCUMENTS
EP    0 831 999 B1    4/2001
(Continued)

OTHER PUBLICATIONS

"GeonTM 130 Series Dispersion Resins." PolyOne. Accessed Aug. 29, 2009. http://www.polyone.com/en-us/products/vinylblendingresins/Pages/Geon130SeriesDispersionResins.aspx.*

(Continued)

*Primary Examiner* — Callie E Shosho
*Assistant Examiner* — Nicholas Kokkinos
(74) *Attorney, Agent, or Firm* — Kriegsman & Kriegsman

(57) ABSTRACT

A method for labeling fabrics, such as fabric garments, and a heat-transfer label (311) well-suited for use in said method. In one embodiment, the heat-transfer label (311) comprises (i) a support portion (313), the support portion (313) comprising a carrier (315) and a release layer (317); (ii) a wax layer (319), the wax layer overcoating the release layer (317); and (iii) a transfer portion (321), the transfer portion (321) comprising an adhesive layer (323) printed directly onto the wax layer (319) and an ink design layer (325) printed directly onto the adhesive layer (323). Each of the adhesive layer (323) and the ink design layer includes a non-cross-linked PVC resin. The ink design layer may be screen printed onto the adhesive layer (323) or may be printed onto the adhesive layer (323) using thermal transfer printing, ink jet printing or laser printing.

17 Claims, 8 Drawing Sheets

U.S. PATENT DOCUMENTS

| | | | |
|---|---|---|---|
| 3,657,832 A | 4/1972 | Valentine | |
| 3,660,212 A | 5/1972 | Liebe, Jr. | |
| 3,793,112 A | 2/1974 | Sontag et al. | |
| RE28,542 E | 9/1975 | Meyer | |
| 3,920,499 A | 11/1975 | Day et al. | |
| 3,959,555 A | 5/1976 | Day et al. | |
| 3,992,559 A | 11/1976 | Day et al. | |
| 4,078,113 A | 3/1978 | Starbuck et al. | |
| 4,256,795 A | 3/1981 | Day et al. | |
| 4,544,590 A | 10/1985 | Egan | |
| 4,786,349 A | 11/1988 | Mahn, Sr. | |
| 4,875,961 A | 10/1989 | Oike et al. | |
| 4,880,686 A | 11/1989 | Yaegashi et al. | |
| 5,073,452 A | 12/1991 | Satou et al. | |
| 5,074,595 A | 12/1991 | Hill et al. | |
| 5,161,829 A | 11/1992 | Detrick et al. | |
| 5,254,302 A | 10/1993 | Yamanaka | |
| 5,296,444 A * | 3/1994 | Saiki et al. | 503/227 |
| 5,411,783 A | 5/1995 | Mahn, Jr. | |
| 5,456,969 A * | 10/1995 | Suzuki et al. | 428/32.79 |
| 5,514,516 A * | 5/1996 | Vanmaele | 430/201 |
| 5,538,831 A | 7/1996 | Oshima et al. | |
| 5,573,834 A * | 11/1996 | Stahl | 428/195.1 |
| 5,583,489 A | 12/1996 | Loemker et al. | |
| 5,658,647 A | 8/1997 | Magill et al. | |
| 5,662,758 A | 9/1997 | Hamilton et al. | |
| 5,766,397 A * | 6/1998 | Jones | 156/230 |
| 5,788,796 A | 8/1998 | Look et al. | |
| 5,800,890 A | 9/1998 | Myers | |
| 5,813,772 A | 9/1998 | Magill et al. | |
| 5,832,827 A | 11/1998 | Pistro et al. | |
| 5,908,694 A | 6/1999 | Makar et al. | |
| 5,935,694 A | 8/1999 | Olmstead et al. | |
| 6,114,021 A | 9/2000 | Pankratz et al. | |
| 6,147,604 A | 11/2000 | Wiklof et al. | |
| 6,152,621 A | 11/2000 | Langan | |
| 6,250,316 B1 | 6/2001 | Brandt et al. | |
| 6,254,970 B1 | 7/2001 | Hiatt et al. | |
| 6,261,734 B1 * | 7/2001 | Platzer | 430/253 |
| 6,309,498 B1 | 10/2001 | Doi | |
| 6,376,069 B1 | 4/2002 | Bilodeau et al. | |
| 6,383,710 B2 | 5/2002 | Hare et al. | |
| 6,395,373 B2 | 5/2002 | Conti et al. | |
| 6,423,466 B2 | 7/2002 | Hare et al. | |
| 6,521,327 B1 | 2/2003 | Franke | |
| 6,797,747 B1 | 9/2004 | Patel et al. | |
| 6,893,717 B1 | 5/2005 | Tsai et al. | |
| 7,102,657 B2 | 9/2006 | Chamandy | |
| 7,151,552 B2 | 12/2006 | Chamandy | |
| 2001/0005543 A1 | 6/2001 | Haneda et al. | |
| 2002/0109636 A1 | 8/2002 | Johnson et al. | |
| 2003/0044595 A1 | 3/2003 | Christian et al. | |
| 2003/0063139 A1 | 4/2003 | Hohberger et al. | |
| 2003/0136503 A1 | 7/2003 | Green et al. | |
| 2003/0203193 A1 | 10/2003 | Murata et al. | |
| 2004/0179083 A1 | 9/2004 | Chamandy | |

FOREIGN PATENT DOCUMENTS

| | | |
|---|---|---|
| EP | 0 844 097 B1 | 7/2001 |
| EP | 1 225 062 A2 | 7/2002 |
| EP | 0 947 967 B1 | 11/2003 |
| EP | 1 388 827 A2 | 2/2004 |
| EP | 1 457 351 A1 | 9/2004 |
| JP | S56-167490 | 12/1981 |
| JP | H05-246197 | 9/1993 |
| JP | H07-299996 | 11/1995 |
| JP | H08-192566 | 7/1996 |
| JP | 1997122605 A | 5/1997 |
| JP | 1997297536 A | 11/1997 |
| JP | 2000284694 | 10/2000 |
| JP | 2002347362 | 12/2002 |
| JP | 2003063158 A | 3/2003 |
| WO | WO 95/31800 A1 | 11/1995 |
| WO | WO 96/08596 A1 | 3/1996 |
| WO | WO 96/40508 A1 | 12/1996 |
| WO | WO 96/40526 A1 | 12/1996 |
| WO | WO 98/03724 A1 | 1/1998 |
| WO | WO 01/03950 A1 | 1/2001 |
| WO | WO 01/12447 A1 | 2/2001 |
| WO | WO 03/029005 A2 | 4/2003 |
| WO | WO 2004/050262 A1 | 6/2004 |

OTHER PUBLICATIONS

U.S. Appl. No. 11/827,394, He et al.

Le, "Progress and Trends in Ink-jet Printing Technology," Journal of Imaging Science and Technology, 42:49-62 (19998).

* cited by examiner

HEAT TRANSFER LABEL FOR FABRIC WITH THERMOCHROMIC INK AND ADHESIVE SURFACE ROUGHNESS

CROSS-REFERENCE TO RELATED APPLICATIONS

The present application claims the benefit under 35 U.S.C. 119(e) of U.S. Provisional Patent Application Ser. No. 60/430,216, filed Dec. 2, 2002, and U.S. Provisional Patent Application Ser. No. 60/453,661, filed Mar. 11, 2003, both of which are incorporated herein by reference.

BACKGROUND OF THE INVENTION

The present invention relates generally to the labeling of fabrics and relates more particularly to the labeling of fabric garments.

It is customary for manufacturers of garments and other finished fabrics (e.g., towels, bed linens, tablecloths, etc.) to attach thereto one or more label displaying various items of information, such as article size, fiber content, instructions for care, and the manufacturer's name or trademark. Such labels, which are to be contrasted with hanging price tags and the like, are typically not intended to be removed by the consumer after the purchase of the article, but rather, are intended to be permanently affixed to the article. In fact, such labels are commonly known in the industry as permanent care labels and typically comprise a small piece of cloth which is sewn directly onto the article, said small piece of cloth bearing the information described above.

Unfortunately, the presence of a permanent care label on certain articles, such as undergarments or other garments in which the label is in direct contact with the wearer's skin, can become irritating to the wearer. As a result, it is not uncommon for a wearer of such a garment to remove the permanent care label, typically by cutting or simply by ripping the permanent care label from the garment. However, as can readily be appreciated, such a practice not only results in a loss of the information contained on the label but the act of cutting or ripping the permanent care label from the garment can also result in significant damage to the garment, itself.

One approach to this problem has been to replace the aforementioned permanent care cloth label sewn onto the garment with a heat-transfer label applied to the garment. One such type of heat-transfer label construction comprises (a) a support portion, said support portion including (i) a polyethylene film carrier having a thickness of about 4 mil; and (ii) a polyacrylate/ester/silicone release of about 3 microns applied to the top of said carrier; and (b) a transfer portion, said transfer portion including (i) a protective layer, said protective layer being positioned directly on top of the release layer and having a thickness of about 3.5 microns; (ii) one or more ink layers positioned on top of the protective layer and having a thickness of about 5-9 microns; and (iii) a heat-activatable polyester/ester/silicone adhesive layer, said adhesive layer being positioned on top of the one or more ink layers and having a thickness of about 2 mil and a melting temperature of about 102-113° C. Typically, the support portion is in the form of an elongated web, with a plurality of discrete transfer portions being spaced thereover. In use, the garment to be labeled is set on a mandrel, and the heat-transfer label construction is inverted so that the adhesive layer of one of its transfer portions is positioned over the garment. A heated press is then brought down on top of the support portion to press the adhesive layer of the transfer portion against the garment and to heat the label construction through the support portion. The heating of the construction causes the activation of the adhesive layer against the garment. The heated press is then removed from the support portion, and the heated construction is allowed to cool on the garment. Once the heated construction has cooled sufficiently, the support portion is peeled away from the transfer portion, resulting in a labeled garment. The label construction may then be advanced so that another transfer portion is aligned with the mandrel, and the process may then be repeated for another garment.

One problem with the heat-transfer approach described above is that the transfer portion, once applied to a garment, must be allowed to cool prior to the peeling away of the support portion therefrom. If such a period of time is not provided to permit the heated transfer portion to cool, the release of the transfer portion from the support portion will not be clean, and the transfer portion will not transfer completely to the garment. This is problematic because the cooling step, which can have a duration in the range of several seconds up to one or more minutes, adds time to the labeling process, thereby limiting the throughput of the process.

Other documents relating to the labeling of garments using heat-transfer technology include the following U.S. patents, all of which are incorporated herein by reference: U.S. Pat. No. 6,423,466, inventors Hare et al., which issued Jul. 23, 2002; U.S. Pat. No. 6,383,710, inventors Hare et al., which issued May 7, 2002; U.S. Pat. No. 5,813,772, inventors Magill et al., which issued Sep. 29, 1998; U.S. Pat. No. 5,411,783, inventor Mahn, Jr., which issued May 2, 1995; U.S. Pat. No. 4,786,349, inventor Mahn, Sr., which issued Nov. 22, 1988; U.S. Pat. No. 4,256,795, inventors Day et al., which issued Mar. 17, 1981; U.S. Pat. No. 3,992,559, inventors Day et al., which issued Nov. 16, 1976; U.S. Pat. No. 3,959,555, inventors Day et al., which issued May 25, 1976; U.S. Pat. No. 3,920,499, inventors Day et al., which issued Nov. 18, 1975; and U.S. Reissue Pat. No. 28,542, inventor Meyer, which reissued Sep. 2, 1975.

SUMMARY OF THE INVENTION

It is an object of the present invention to provide a new method for labeling fabrics, such as, but not limited to, fabric garments.

It is another object of the present invention to provide a method as described above that overcomes at least some of the shortcomings discussed above in connection with existing methods for labeling fabrics.

In furtherance of the above and other objects to be set forth or to become apparent from the description to follow, and according to one aspect of the invention, there is provided a method for labeling an article of fabric, such as a fabric garment, said method comprising the steps of (a) providing a heat-transfer label, said-heat-transfer label comprising (i) a transfer portion, said transfer portion comprising an ink design layer; (ii) a support portion, said transfer portion being positioned over said support portion for transfer of the transfer portion from the support portion to an article of fabric under conditions of heat and pressure, said support portion comprising (A) a carrier, and (B) a release coating positioned over said carrier, said release coating being made of a non-wax, non-silicone, release material; and (b) transferring the transfer portion from the support portion to the article of fabric under conditions of heat and pressure.

According to another aspect of the invention, there is provided a method for labeling an article of fabric, such as a fabric garment, said method comprising the steps of (a) providing a heat-transfer label, said heat-transfer label comprising (i) a transfer portion, said transfer portion comprising an ink design layer; (ii) a support portion, said transfer portion being positioned over said support portion for transfer of the transfer portion from the support portion to an article of fabric under conditions of heat and pressure, said support portion comprising (A) a carrier, and (B) a wax release layer, said wax release layer being deposited over said carrier, said transfer portion being positioned over said wax release layer; and (b) transferring the transfer portion from the support portion to the article of fabric under conditions of heat and pressure.

The present invention is also directed to a heat-transfer label well-suited for use in labeling an article of fabric. According to one aspect, such a heat-transfer label comprises a heat-transfer label well-suited for labeling fabric, said heat-transfer label comprising (a) a carrier; (b) a release coating positioned over said carrier and in direct contact therewith, said release coating being made of a non-wax, non-silicone, release material; and (c) an ink design layer, said ink design layer being positioned over said release coating and in direct contact therewith.

According to another aspect, such a heat-transfer label comprises (a) a carrier; (b) a release coating positioned over said carrier and in direct contact therewith; and (c) an ink design layer, said ink design layer being positioned over said release coating, said ink design layer comprising a polyvinyl chloride resin.

According to yet another aspect, such a heat-transfer label comprises (a) a support portion; and (b) a transfer portion, said transfer portion being positioned over said support portion for transfer of the transfer portion from the support portion to an article of fabric under conditions of heat and pressure, said transfer portion comprising (i) an ink design layer; and (ii) a heat-activatable adhesive layer, said heat-activatable adhesive layer having a surface roughness not exceeding about 15 microns; (iii) wherein said ink design layer and said heat-activatable adhesive layer are positioned relative to one another so that one of said ink design layer and said heat-activatable adhesive layer is positioned above the other.

According to still yet another aspect, such a heat-transfer label comprises (a) a support portion; and (b) a transfer portion, said transfer portion being positioned over said support portion for transfer of the transfer portion from the support portion to an article of fabric under conditions of heat and pressure, said transfer portion comprising (i) an ink design layer; (ii) a heat-activatable adhesive layer; and (iii) an RFID device positioned between said ink design layer and said heat-activatable adhesive layer.

The present invention is also directed to a method of making a heat-transfer label. According to one aspect, such a method comprises the steps of (a) providing a releasable support; (b) then, printing an ink design layer over said releasable support; (c) then, printing a heat-activatable adhesive layer over said ink design layer; and (d) then, printing a marking directly onto said heat-activatable adhesive layer. A preferred embodiment of this method produces custom labels by using a variable printing technique to form the marking. The ink design layer can be applied by the manufacturer of the heat-transfer label, and the variable marking can be applied thereafter by a purchaser of the label just prior to transfer of the label to an article.

According to another aspect, such a method comprises the steps of (a) providing a releasable support; (b) then, printing a heat-activatable adhesive layer over said releasable support; and (c) then, printing a first ink design layer directly onto said heat-activatable adhesive layer. A preferred embodiment of this method produces custom labels by using a variable printing technique to form the first ink design layer.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
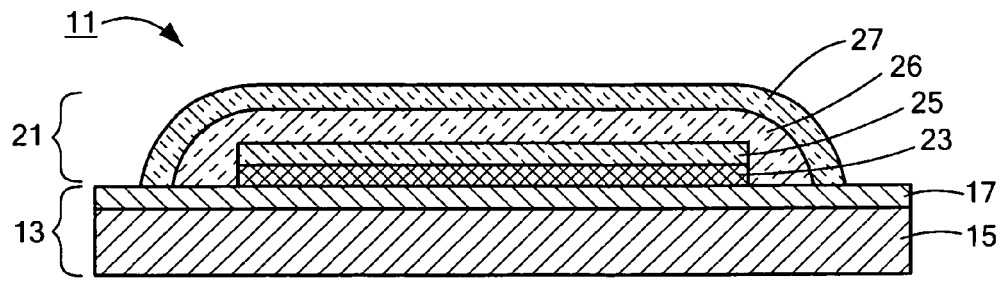
FIG. 1 is a schematic section view of a first embodiment of a heat-transfer label well-suited for use in labeling articles of fabric.

Referring now to FIG. 1, there is shown a schematic section view of a first embodiment of a heat-transfer label well-suited for use in labeling articles of fabric, said heat-transfer label being constructed according to the teachings of the present invention and being represented generally by reference numeral 11.

Label 11 comprises a support portion 13. Support portion 13, in turn, comprises a carrier 15. Carrier 15 may be a paper substrate, a polymer-coated paper substrate, or a polymer film substrate. Preferably, carrier 15 is a polymer film substrate having a glass transition temperature in the range of 60° C. to 250° C. and having a storage modulus in the range of $1.0 \times 10^{10}$ dynes/cm$^2$ to $2.0 \times 10^{10}$ dynes/cm$^2$ at ambient temperature and a storage modulus in the range of $5.0 \times 10^7$ to $1.5 \times 10^{10}$ dynes/cm$^2$ at 100° C. Examples of materials particularly preferred for use as carrier 15 include polyester films, particularly polyethylene terephthalate (PET) films and poly(ethylene 2,6-naphthalene dicarboxylate) (PEN) films, and oriented polypropylene films, particularly heat-stabilized, oriented polypropylene films. This is because, at least as compared to some other plastic materials like polyethylene and non-oriented polypropylene, polyester has better mechanical properties and makes a better substrate to be printed onto. In addition, unlike polyethylene, polyester does not tend to soften and become tacky at the types of temperatures typically encountered during heat-transfer.

More preferably, carrier 15 is a plastic film of the type described above that is additionally optically clear. As can readily be appreciated, one benefit to using a clear material as carrier 15 is that, if desired, one can inspect the quality of the printed matter of the label by looking at said printed matter through carrier 15 (from which perspective said printed matter appears as it will on the labelled article), as opposed to looking at said printed matter through the adhesive layer of the label (from which perspective said printed matter appears as the mirror image of what will appear on the labeled article).

Carrier 15 preferably has a thickness of about 0.5-7 mil, more preferably about 0.9-3.0 mil, even more preferably about 1.4-2 mil.

Support portion 13 also includes a release layer or coating 17, coating 17 preferably being applied directly to the top of carrier 15. Coating 17 is a release material that preferably separates cleanly from the below-described transfer portion of label 11 and is not transferred, to any visually discernible degree, with said transfer portion of label 11 onto an article being labeled. (For purposes of the present specification and claims, the term "visually discernible" is to be construed in terms of an unaided or naked human eye.) Moreover, in addition to separating cleanly from the transfer portion of label 11, coating 17 preferably permits the separation of the transfer portion of label 11 from coating 17 soon (i.e., within a few seconds) after said transfer portion has been applied to an article of fabric. Preferably, release coating 17 is clear for the same types of reasons given above in connection with carrier 15.

Coating 17 preferably has a thickness of about 0.01 to 10 microns, more preferably about 0.02 to 1 micron, even more preferably about 0.1 micron.

Preferably, coating 17 and carrier 15 are selected so that the release force required to peel a unit width of pressure sensitive tape from coating 17 at 180 degrees is in the range of about 0.5-5.0 lb/inch, more preferably about 1.5-3.5 lb/inch, even more preferably about 2.1-2.4 lb/inch. For purposes of the present specification and claims, the release force required to peel a unit width of pressure sensitive tape from coating 17 at 180 degrees is determined in accordance with Adhesion Test Method PSTC-4B, which is described in *Test Methods for Pressure Sensitive Adhesive Tapes*, 13$^{th}$ Edition, published by Pressure Sensitive Tape Council, Northbrook, Ill. (2000), and which is incorporated herein by reference.

A variety of different substances may be applied to carrier 15 to form coating 17. One such substance is an olefinic material that does not contain any waxes or any silicones, except to the limited extent provided below. (The terms "non-wax" and "non-silicone," when used in the present specification and claims, to describe or to define a release layer or coating formed from such a substance, are defined herein to exclude from said release layer or coating the presence of any and all waxes and silicones not encompassed by the limited exceptions provided below.) The coating formed from said olefinic substance has a total surface energy of about 25 to 35 mN/m (preferably about 30 mN/m), of which about 0.1 to 4 mN/m (preferably about 1.3 mN/m) is polar surface energy. When analyzed by XPS (X-ray photoelectron spectroscopy), said coating has a carbon content (by atomic %) of about 90 to 99.9% (preferably about 97%) and an oxygen content (by atomic %) of about 0.1 to 10% (preferably about 3%). Examples of a support portion 13 that includes a carrier 15 and a coating 17 as described above are commercially available from DuPont Corp. (Wilmington, Del.) as MYLAR® A701-142 gauge polyester film and MYLAR® A701-200 gauge polyester film. The release force required to peel, at 180 degrees, a unit width of pressure sensitive tape from coating 17 of MYLAR® A701-142 gauge polyester film is 2.117 lb/inch and from coating 17 of Mylar MYLAR® A701-200 gauge polyester film is 2.386 lb/inch.

Because it is common to wind a continuous web of heat-transfer labels into a roll, one advantage to using a non-wax, non-silicone release coating of the type described above in a heat-transfer label construction is that there is no chance of the release coating contaminating the adhesive layer of the transfer portion with wax or silicone. This may be a substantial benefit as the transfer of a wax or silicone residue onto the adhesive layer may adversely affect the adhesive properties of the adhesive layer during label transfer.

Another advantage of a non-wax release coating over a wax release coating is that a non-wax release coating is typically capable of being used over a broader range of operating temperatures than is a wax release coating, which typically must be heated to its melting temperature.

Another advantage of a non-silicone release coating over a silicone release coating is that a non-silicone release coating typically has better printability than does a silicone release coating.

Notwithstanding the above, instead of being formed from the non-wax, non-silicone, olefinic substance described above, release coating 17 may comprise a phosphate ester coating, such as RA-150W release coat (Mayzo, Inc., Norcross, Ga.), a carbamate coating, a silicone coating, a fluorocarbon coating or a wax coating, such as a polyethylene-based wax coating of the type described below.

Still other types of coated polymer films which may be used as support portion 13 are described in PCT Application No. PCT/US00/17703, which was published on Jan. 18, 2001, and in European Patent Application No. 819,726, published Jan. 21, 1998, both of which are incorporated herein by reference. Both of the aforementioned patent applications teach a coated film structure preferably comprising:

(i) polymers selected from the group consisting of polyesters such as polyethylene terephthalate and poly(ethylene 2,6-naphthalene dicarboxylate); polyolefins such as polyethylene and polypropylene; and polyamides; wherein said polymers form a polymeric film surface; and (ii) a primer coating comprising:
(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and
(B) crosslinking agents selected from the group consisting of amino formaldehyde resins, polyvalent metal salts, isocyanates, blocked isocyanates, epoxy resins and polyfunctional aziridines;
(iii) wherein said primer coating is applied as a primer to the polymeric film surface, preferably in its: amorphous or semi-oriented state and reacted with newly generated polymeric film surfaces formed during uniaxial or biaxial stretching and heat setting.

Another example of a suitable support portion 13 may be found in U.S. Pat. No. 6,423,406, which is incorporated herein by reference.

Additives such as coating aids, wetting aids such as surfactants (including silicone surfactants), slip additives, antistatic agents may be incorporated into release coating 17 in levels from 0 to 50% based on the total weight of additive-free coating solids.

The above-described release coating 17 may additionally be applied to the bottom surface of the polymeric carrier 15 for use in preventing the adhesive layer of a transfer portion from adhering to the underside of carrier 15 when a label assembly comprising a plurality of transfer portions on a single support portion 13 is wound into a roll.

Label 11 further comprises a transfer portion 21 (it being understood that, even though only a single transfer portion 21 is shown on a slightly oversized support portion 13 in FIG. 1, one need not position only one transfer portion 21 per support portion 13, but rather, one may space apart at regular intervals a plurality of identical or different transfer portions 21 on an elongated common web of support portion 13). Transfer portion 21 preferably includes (i) a protective lacquer layer 23 printed directly on top of a desired area of release layer 17, (ii) an ink design layer 25 printed directly onto a desired area of lacquer layer 23, (iii) a primer layer 26 printed directly onto ink design layer 25, any exposed areas of protective lacquer layer 23, and a surrounding area of release layer 17, and (iv) a heat-activatable adhesive layer 27 printed directly onto primer layer 26 and a surrounding area of release layer 17.

Protective lacquer layer 23, which preferably has a thickness of about 0.1 mil, may be formed from a wide variety of different resins, both water-based and solvent-based, provided that the resultant layer 23 possesses an acceptable degree of abrasion resistance for a fabric article. A preferred formulation from which protective lacquer layer 23 may be printed includes a combination of a high $T_g$ solvent-based phenoxy resin, such as PKHH phenoxy resin (In Chem Corp., Rock Hill, S.C.), and a low $T_g$ solvent-based polyurethane resin, such as ESTANE 5715 polyurethane resin (Noveon, Inc., Cleveland, Ohio), such resins preferably being combined in a 1 to 3 ratio with an organic solvent, such as cyclohexanone and/or a dibasic ester (e.g., dimethyl adipate). In addition, an adhesion promoter, such as NB 80 polymeric aliphatic isocyanate adhesion promoter (Nazdar Ink, Shawnee, Kans.), is preferably included in the formulation to enhance printing quality, said adhesion promoter being present in an amount constituting about 0 to 10%, by weight, more preferably 2 to 8%, by weight. A small amount (less than 1%) of a surfactant, e.g., ZONYL FSO fluorosurfactant (DuPont, Wilmington, Del.), may also be added to the formulation prior to printing.

The aforementioned combination of a low $T_g$ polyurethane polymer and a high $T_g$ phenoxy polymer is particularly desirable as it results in a medium $T_g$ mixture that provides a "soft" feeling with the right polymer modulus that prevents the label construction from blocking when the label construction is manufactured as a self-wound roll.

Another preferred formulation from which protective lacquer layer 23 may be printed includes 100 parts NAZDAR 9627 clear overprint varnish (Nazdar Ink, Shawnee, Kans.) and 5 parts NB 80 adhesion promoter.

Other suitable protective lacquer layers 23 may be found in the following patents, all of which are incorporated herein by reference: U.S. Pat. Nos. 5,800,656; 6,033,763; 6,083,620; and 6,099,944.

To form protective lacquer layer 23, a lacquer dispersion or solution of the type described above is deposited onto a desired area of release layer 17, preferably by screen printing, gravure printing, flexographic printing or a similar technique. (Considerations relevant in deciding whether to use screen printing, gravure printing or flexographic printing to print a given layer, such as lacquer layer 23, include the particle size of the composition to be printed and the thickness of the layer one wishes to print. Screen printing is most suitable for compositions having a larger particle size (i.e., as great as about 100-200 microns) and where a thicker layer is desired (i.e., about 5-200 microns). Gravure printing is most suitable for compositions having a smaller particle size (i.e., no more than a micron or two) and where a thinner layer is desired (i.e., about 1-2 microns). Flexographic printing is suitable for compositions having a particle size of no more than several microns and where a thin layer of about 1-10 microns is desired.)

After deposition of the lacquer composition onto the desired area of layer 17, the volatile component(s) of the composition evaporate(s), leaving only the non-volatile components thereof to make up lacquer layer 23.

Ink design layer 25 of transfer portion 21, which layer may actually comprise either a single ink layer or a plurality of ink layers, may be formed from one or more of a wide variety of different inks provided that the resultant layer 25 possesses an acceptable degree of adhesion to both protective lacquer layer 23 and primer layer 26. For example, where protective lacquer layer 23 comprises a water-based resin, one may use a water-based ink, such as the NAZDAR 2700 series of AQUA-SAFE GLOSS P.O.P. water-based screen inks (Nazdar, Shawnee, Kans.). By contrast, where protective lacquer layer 23 comprises a solvent-based resin, one may use a solvent-based ink, such as the NAZDAR 9600 series of polyester inks. (Where the NAZDAR 9600 series of polyester inks are used, such inks may be thinned, prior to printing, with about 5-10% of a thinner, such as NAZDAR 9630 thinner.) Preferably, an adhesion promoter, such as NB 80 adhesion promoter, is included in the ink formulation to enhance printing quality, said adhesion promoter being present in an amount constituting about 0 to 10%, by weight, more preferably 2 to 8%, by weight. An example of a preferred ink formulation comprises 100 parts NAZDAR 96PB22 blue ink and 5 parts NB 80 adhesion promoter.

Ink design layer 25, which preferably has a thickness of about 0.2 mil, is formed in the conventional manner by depositing, preferably by screen printing, one or more ink compositions of the type described above onto one or more desired areas of lacquer layer 23 and, thereafter, allowing the volatile component(s) of the ink composition(s) to evaporate, leaving only the non-volatile ink components to form layer 25.

It should be understood that, although, for ease of illustration, ink design layer 25 is shown in FIG. 1 (and elsewhere in the drawings of the present application) as a continuous layer on lacquer layer 23, ink design layer 25 is typically not in the form of a continuous layer, but rather, is typically in the form of a plurality of discrete elements making up the desired image and/or text of the label.

As can readily be appreciated, depending upon the particular use to which the label is put, ink design layer 25 may include indicia for a permanent care label, an institutional ID, an individual ID, etc. In addition, as will be described below in further detail, at least one of the layers of transfer portion 21 (i.e., lacquer layer 23, ink design layer 25, primer layer 26, adhesive layer 27) could additionally or alternatively include a "watermark" or could include a marking printed with pigments activatable by irradiation with particular wavelengths of light or with heat to enable the screening of labeled articles for product security, such as counterfeit detection.

Primer layer 26, which promotes adhesion between ink layer 25 and adhesive layer 27, is preferably identical in composition to protective layer 23 and may actually comprise either a single primer layer or a plurality of primer layers. Preferably, primer layer 26 has a thickness of about 0.2-0.5 mil.

Where the presence of both protective lacquer layer 23 and primer layer 26 are not needed to maintain the structural integrity and cohesiveness of transfer portion 21, either protective lacquer layer 23 or primer 26 may be omitted.

Adhesive layer 27, which preferably has a thickness of about 4-5 mil, comprises one or more heat-activatable resins and is capable of securely binding to fabric. One example of a suitable adhesive composition for use in forming adhesive layer 27 comprises about 30 g of 5184p polyester powder adhesive (Bostik-Findley, Middleton, Mass.), about 60 g water, about 10 g PKHW 35 water-based phenoxy dispersion (InChem Corp., Rock Hill, S.C.) as a binder, about 1 g of DEHYDRAN 1620 defoamer (Cognis Corp., Ambler, Pa.) and about 2-3 g of TAFIGEL PUR 61 thickener (Ultra Additives, Inc., Clover, S.C.). Preferably, the aforementioned polyester powder adhesive has a particle size of no more than about 80μ, more preferably no more than about 38-40μ, in order to facilitate the screen printing of the adhesive formulation. (If the particle size of the polyester powder adhesive is too big, it may be difficult to screen print the adhesive formulation.)

Another adhesive composition differs from the foregoing composition in that 10 g SANCURE 1601 polyurethane dispersion (Noveon Inc. Cleveland, Ohio) is used instead of the PKHW 35 water-based phenoxy binder; however, the former composition is much preferred over the latter as the latter tends to cause a yellow discoloration in the label after repeated washing cycles. It is believed that such a discoloration is caused by an adverse reaction between the polyurethane binder and the laundering conditions or environment.

Adhesive layer 27 is preferably formed by depositing, by screen printing or the like, onto (i) primer 26 or any exposed portions of lacquer layer 23 and ink layer 25 and (ii) a surrounding area of release coating 17 an adhesive composition of the type described above and then evaporating the volatile component(s) of the composition leaving only the non-volatile solid component(s) thereof to form layer 27.

Label 11 may be used by contacting adhesive layer 27 with a fabric article, such as a fabric garment, while applying sufficient heat to the bottom of carrier 15 (e.g., using a heated platen) so as to cause transfer portion 21 to be released from support portion 13 and so as to cause adhesive layer 27 to become heat-activated for bonding to the desired article. Label 11 may be used with a wide variety of fabric types including, but not limited to, cotton, nylon, polyester, rayon, Spandex and combinations thereof.

One can adjust the type of finish transfer portion 21 exhibits on the labeled article either by peeling support 13 from transfer portion 21 immediately after transfer ("hot release") to yield a matte finish or by peeling support 13 from transfer portion 21 after a short cooling period following transfer to yield a glossy finish.

The present inventors have noted that, when label 11 is used to decorate fabrics, a good degree of label adherence and abrasion resistance is achieved. For example, once applied to fabric, the transfer portion of the label can be stretched with its associated fabric beyond its original size and can go through numerous washing cycles without breaking down significantly or losing image quality. In addition, label 11 results in transfer portion 21 forming a smooth surface on the labeled article, without any puckering on the article, and results in a "soft-feeling" label to the touch. Furthermore, label 11 does not leave a visually discernible residue on the fabric, thereby affording a "no-label-look" to the labeled article.

Moreover, one of the advantages associated with label 11 is that support portion 13 can be peeled away from transfer portion 21 soon (i.e., within a few seconds or less) after transfer portion 21 has been applied to fabric under conditions of heat and pressure. Consequently, label 11 permits virtually continuous labeling, thereby resulting in greater throughput than is possible with existing label constructions.

Figure 2:
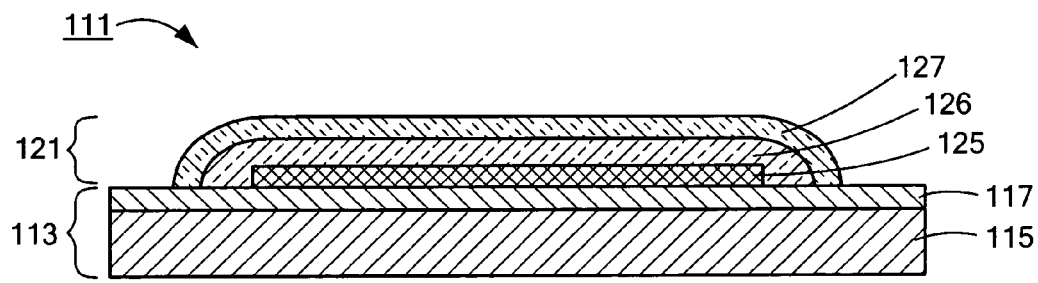
FIG. 2 is a schematic section view of a second embodiment of a heat-transfer label well-suited for use in labeling articles of fabric.

Referring now to FIG. 2, there is shown a schematic section view of a second embodiment of a heat-transfer label well-suited for use in labeling articles of fabric, said heat-transfer label being constructed according to the teachings of the present invention and being represented generally by reference numeral 111.

Heat-transfer label 111 comprises a support portion 113, support portion 113 comprising a carrier 115 and a release layer 117. Carrier 115 is identical carrier 15 of label 11, and release layer 117 is identical to release layer 17 of label 11.

Heat-transfer label 111 also comprises a transfer portion 121 (it being understood that, even though only a single transfer portion 121 is shown on a slightly oversized support portion 113 in FIG. 2, one need not position only one transfer portion 121 per support portion 113, but rather, one may space apart at regular intervals a plurality of identical or different transfer portions 121 on an elongated common web of support portion 113). Transfer portion 121 preferably includes (i) an ink design layer 125 printed directly onto a desired area of release layer 117, (ii) a primer layer 126 printed directly onto ink design layer 125 (as well as onto any exposed areas of release layer 117 within ink design layer 125) and onto a surrounding area of release layer 117, and (iii) a heat-activatable adhesive layer 127 printed directly onto primer layer 126 and a surrounding area of release layer 117.

Ink design layer 125 of transfer portion 121, which layer may actually comprise either a single ink layer or a plurality of ink layers, may be formed from one or more of a wide variety of different inks, provided that the resultant layer 125 possesses an acceptable degree of adhesion to primer layer 126 and releases well from release layer 117. Preferably, ink design layer 125 is printed using an ink containing a polyvinyl chloride (PVC) resin. (For purposes of the present specification and claims, the term polyvinyl chloride is defined to encompass both homopolymers and copolymers of vinyl chloride.) An example of a preferred PVC-containing ink comprises 100 parts GNS BEAR'S NAVY ink (PolyOne Corporation, Avon Lake, Ohio), 10 parts ACUMIST B9 wax (Honeywell International Inc., Morristown, N.J.), 5 parts GEON 137 PVC resin (PolyOne Corporation, Avon Lake, Ohio) and 1 part zinc oxide (Sigma-Aldrich Co., Milwaukee, Wis.) as a cross-linker.

Ink design layer 125, which preferably has a thickness of about 0.1 to 30 microns, more preferably about 1 to 20 microns, is formed in the conventional manner by depositing, preferably by screen printing, one or more ink compositions of the type described above onto one or more desired areas of release layer 117 and, thereafter, allowing any volatile component(s) of the ink composition(s) to evaporate, leaving only the non-volatile ink components to form layer 125. In the case of the above-described PVC-containing ink, there are no such volatile components, but the printed layer must be heated, typically in an IR or UV oven, to fuse or "cure" the layer.

As can readily be appreciated, depending upon the particular use to which the label is put, ink design layer 125 may include indicia for a permanent care label, an institutional ID, an individual ID, etc. In addition, as will be described below in further detail, at least one of the layers of transfer portion 121 (i.e, ink design layer 125, primer layer 126, adhesive layer 127) could additionally or alternatively include a "watermark" or could include a marking printed with pigments activatable by irradiation with particular wavelengths of light or with heat to enable the screening of labeled articles for product security, such as counterfeit detection.

Primer layer 126, which provides structural integrity to transfer portion 121 and which promotes adhesion between ink layer 125 and adhesive layer 127, may comprise either a single primer layer or a plurality of primer layers. Preferably, primer layer 126 is printed using a primer composition comprising at least one of the following polymers: one or more polyurethane polymers, one or more phenoxy polymers, and one or more polyvinyl chloride polymers. An example of a preferred primer composition comprises 100 parts PRINTABLE ADHESIVE PVC primer plastisol (PolyOne Corporation, Avon Lake, Ohio) and 15 parts GEON 124 PVC resin (PolyOne Corporation, Avon Lake, Ohio).

Primer layer 126, which preferably has a thickness of about 0.1 to 50 microns, more preferably about 1 to 20 microns, is formed in the conventional manner by depositing, preferably by screen printing, gravure printing, or flexographic printing, the primer composition of the type described above onto ink layer 125, the exposed areas of release layer 117 within ink layer 125, and an area of release layer 117 surrounding ink layer 125 and, thereafter, allowing the volatile component(s) of the primer composition(s) to evaporate, leaving only the non-volatile primer components to form layer 126.

Adhesive layer 127, which preferably has a thickness of about 10 to 200 microns, more preferably about 20 to 80 microns, comprises one or more heat-activatable resins and is capable of securely binding to fabric, adhesive layer 127 preferably having a melting point in the range of about 60 to 150° C., more preferably about 80 to 120° C. Examples of resins suitable for use in forming adhesive layer 127 include polyester resins, such as HMP 5184 V polyester powder adhesive resin (Bostik-Findley, Middleton, Mass.), and polyamide resins, such as GRILTEX 2AP1 polyamide resin (Griltech, Sumter, S.C.). A specific example of a suitable adhesive composition for use in forming adhesive layer 127 comprises 450 parts HMP 5184 V polyester powder resin (Bostik-Findley, Middleton, Mass.) as an adhesive, 150 parts PKHW 35 phenoxy dispersion (InChem Corp., Rock Hill, S.C.) as a binder, 110 parts TAFIGEL PUR 61 thickener (Ultra Additives, Inc., Clover, S.C.), 12 parts DEHYDRAN 1620 defoamer (Cognis Corp., Ambler, Pa.), 6 parts ZONYL FSA wetting agent (DuPont, Wilmington, Del.), and 1800 parts water.

Adhesive layer 127 is preferably formed by depositing, by screen printing or the like, an adhesive composition of the type described above onto primer 126 and a surrounding area of release coating 117 and then evaporating the volatile component(s) of the composition leaving only the non-volatile solid component(s) thereof to form layer 127.

Label 111 may be used in the same manner as label 11. Like label 11, label 111 results in a labeled article that can withstand many (i.e., as many as 50) washing cycles without undergoing a significant loss in image quality, structural integrity or label softness.

Figure 3:
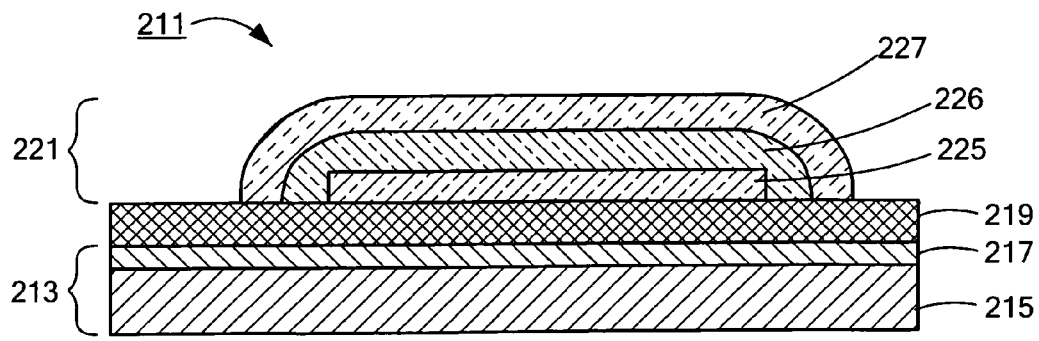
FIG. 3 is a schematic section view of a third embodiment of a heat-transfer label well-suited for use in labeling articles of fabric.

Referring now to FIG. 3, there is shown a schematic section view of a third embodiment of a heat-transfer label well-suited for use in labeling articles of fabric, said heat-transfer label being constructed according to the teachings of the present invention and being represented generally by reference numeral 211.

Heat-transfer label 211 comprises a support portion 213, support portion 213 comprising a carrier 215 and a release layer 217. Carrier 215 is identical to carrier 15 of label 11, and release layer 217 is identical to release layer 17 of label 11.

Heat-transfer label 211 also comprises a wax layer 219, wax layer 219 overcoating release layer 217 of support portion 213. Wax layer 219, which serves to facilitate the release of the transfer portion to be described below from support portion 213, preferably has a thickness of about 1 to 20 microns, more preferably about 4 to 15 microns, and preferably has a melting point of about 60 to 130° C., more preferably about 80 to 120° C. Wax layer 219 preferably comprises a polyethylene-based wax and may be printed (preferably by screen printing) from a composition comprising 1350 parts ACUMIST D5 powdered wax (Honeywell, Morristown, N.J.), 450 parts ME 48040 M2 wax emulsion (Michaelman, Cincinnati, Ohio), 300 parts TAFIGEL PUR 61 thickener (Ultra Additive, Clover, S.C.), 36 parts DEHYDRAN 1620 defoamer (Cognis, Ambler, Pa.), ZONYL FSA wetting agent (DuPont, Wilmington, Del.), and 5400 parts water.

Preferably, the aforementioned formulation is prepared using a HOCKMEYER mixer (Hockmeyer Equipment Corporation, Elizabeth City, N.C.) to form a uniform, stable wax slurry, which is storage stable under ambient conditions in a closed container. Screen printing of the formulation may be performed using a 250 mesh screen at a print speed of 2100 imprints per hour. The printed wax layer may be dried and melted by heat from UV and IR lamps of a SMAG press (Smag Graphique, Savigny-Sur-Orge Cedex, France). Solidification and crystallization of the wax may be achieved by forced air cooling after exiting the heating zone.

It should be understood that it may not be necessary in all instances to include both release layer 217 and wax layer 219 in label 211 in order to achieve the desired release of the transfer portion from the support portion 213. Therefore, in such instances, one may omit one of layers 217 and 219 from label 211.

Heat-transfer label 211 further comprises a transfer portion 221 (it being understood that, even though only a single transfer portion 221 is shown in FIG. 3, one need not position only one transfer portion 221 per support portion 213, but rather, one may space apart at regular intervals a plurality of identical or different transfer portions 221 on an elongated common web of support portion 213). Transfer portion 221 preferably includes (i) an ink design layer 225 printed directly onto a desired area of wax layer 219, (ii) a primer layer 226 printed directly onto ink design layer 225 (as well as onto any exposed areas of wax layer 219 within ink design layer 225) and onto a surrounding area of wax layer 219, and (iii) a heat-activatable adhesive layer 227 printed directly onto primer layer 226 and a surrounding area of wax layer 219.

Ink design layer 225 of transfer portion 221 may actually comprise either a single ink layer or a plurality of ink layers. Preferably, ink design layer 225 comprises a polyvinyl chloride (PVC) resin that has been cross-linked using at least one cross-linker, said at least one cross-linker preferably having more than one functional group per molecule, said functional group being at least one of isocyanate, aziridine, carbodiimide, alkoxymethyl and methylol. (Without wishing to be limited to any particular theory as to how the invention operates, the present inventors believe that the cross-linking of the PVC resin in ink design layer 225 impedes the diffusion of ink within ink design layer 225 during heat transfer.) An example of a suitable ink composition for use in making ink design layer 225 comprises 144 parts GEON 137 PVC resin (PolyOne Corporation, Avon Lake, Ohio), 80 parts CYMEL 303 hexamethoxymethyl melamine crosslinker (Cytec Corp., West Paterson, N.J.), 54 parts SANTICIZER 160 benzyl butyl phthalate plasticizer (Ferro, Cleveland, Ohio), 54 parts dioctyl phthalate plasticizer (ChemCentral, Bedford Park, Ill.), 25.2 parts CYCAT 296-9 catalyst (Cytec Corp., West Paterson, N.J.), 20.08 parts VIOLET PC colorant (PolyOne Corporation, Avon Lake, Ohio), 15.48 parts BLUE PC colorant (PolyOne Corporation, Avon Lake, Ohio) and 5.04 parts BRIGHT YELLOW PC colorant (PolyOne Corporation, Avon Lake, Ohio).

Ink design layer 225, which preferably has a thickness of about 0.1 to 30 microns, more preferably about 1 to 20 microns, is formed in the conventional manner by depositing, preferably by screen printing, gravure printing or flexographic printing, one or more ink compositions of the type described above onto one or more desired areas of wax layer 219 and, thereafter, allowing any volatile component(s) of the ink composition(s) to evaporate, leaving only the non-volatile ink components to form layer.

As can readily be appreciated, depending upon the particular use to which the label is put, ink design layer 225 may include indicia for a permanent care label, an institutional ID, an individual ID, etc. In addition, as will be described below in further detail, at least one of the layers of transfer portion 221 (i.e, ink design layer 225, primer layer 226, adhesive layer 227) could additionally or alternatively include a "watermark" or could include a marking printed with pigments activatable by irradiation with particular wavelengths of light or with heat to enable the screening of labeled articles for product security, such as counterfeit detection.

Primer layer 226, which provides some structural support to ink design layer 225 as adhesive layer 227 softens during heat transfer (and, in so doing, impedes distortion of the design of ink layer 225), may comprise either a single primer layer or a plurality of primer layers. Preferably, primer layer 226 comprises a cross-linker and at least one of the following polymers: one or more polyurethane polymers, one or more phenoxy polymers, and one or more polyvinyl chloride polymers. Said cross-linker preferably has more than one functional group per molecule, said functional group being at least one of isocyanate, aziridine, carbodiimide, alkoxymethyl and methylol. An example of a preferred primer composition comprises 100 parts GEON 137 PVC resin (PolyOne Corporation, Avon Lake, Ohio), 55 parts SANTICIZER 160 plasticizer (Ferro, Cleveland, Ohio), 55 parts dioctyl phthalate plasticizer (ChemCentral, Bedford Park, Ill.), and 10.5 parts NB 80 adhesion promoter (Nazdar, Shawnee, Kans.).

Primer layer 226, which preferably has a thickness of about 0.1 to 50 microns, more preferably about 1 to 20 microns, is formed in the conventional manner by depositing, preferably by screen printing, gravure printing or flexographic printing, the primer composition of the type described above onto ink layer 225, the exposed areas of wax layer 219 within ink layer 225, and an area of wax layer 219 surrounding ink layer 225 and, thereafter, allowing the volatile component(s) of the primer composition(s) to evaporate, leaving only the non-volatile primer components to form layer 226.

Adhesive layer 227, which preferably has a thickness of about 10 to 200 microns, more preferably about 20 to 80 microns, comprises one or more heat-activatable resins and is capable of securely binding to fabric, adhesive layer 227 preferably having a melting point in the range of about 60 to 150° C., more preferably about 80 to 120° C. Examples of resins suitable for use in forming adhesive layer 227 include polyesters, such as HMP 5184 V polyester powder adhesive resin (Bostik-Findley, Middleton, Mass.), polyamides, such as GRILTEX 4AP1 polyamide resin (Griltech, Sumter, S.C.), and polyvinyl chlorides, such as GEON 137 PVC resin (PolyOne, Avon Lake, Ohio). A specific example of a suitable adhesive composition for use in forming adhesive layer 227 comprises 100 parts GEON 137 PVC resin (PolyOne, Avon Lake, Ohio), 55 parts SANTICIZER 160 plasticizer (Ferro, Cleveland, Ohio), 55 parts dioctyl phthalate plasticizer (ChemCentral, Bedford Park, Ill.) and 47 parts GRILTEX 4AP1 adhesive (Griltech, Sumter, S.C.).

Adhesive layer 227 is preferably formed by depositing, by screen printing or the like, onto primer 226 and a surrounding area of wax layer 219 an adhesive composition of the type described above and then evaporating the volatile component(s) of the composition leaving only the non-volatile solid component(s) thereof to form layer 227.

Label 211 may be used in the same manner as label 111. It should be noted that the present inventors have found that the print quality of label 211, following heat transfer, is generally superior to that of label 111. Without wishing to be limited to any particular theory of the invention, it is believed that the inclusion of a cross-linker in ink layer 225 and in primer 226 prevents diffusion of the ink image when subjected to heat.

In addition, where a PVC resin is used as the principal resin in each of adhesive layer 227, primer layer 226 and ink layer 225, the transferred label appears to be more resistant to cracking and other structural damage following repeated (i.e., as many as 50) washing cycles than is the case for a label having the above-described polyester-based adhesive. In addition, the transferred label retains its image quality better and is softer to the touch and, therefore, more comfortable to a wearer than a label having the above-described polyester-based adhesive.

Lastly, it should be noted that it may not be necessary in all instances to include both release layer 217 and wax layer 219 in label 211 in order to achieve the desired release of transfer portion 221 from support portion 213. Therefore, in such instances, one may omit one of layers 217 and 219 from label 211.

Figure 4:
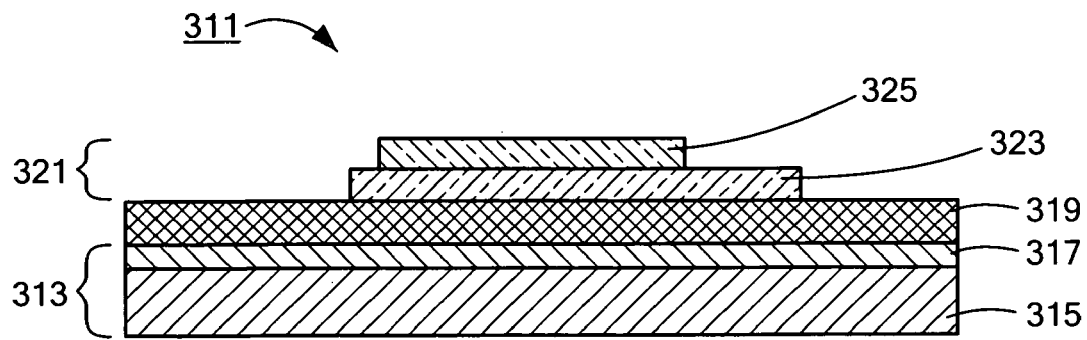
FIG. 4 is a schematic section view of a fourth embodiment of a heat-transfer label well-suited for use in labeling articles of fabric.

Referring now to FIG. 4, there is shown a schematic section view of a fourth embodiment of a heat-transfer label well-suited for use in labeling articles of fabric, said heat-transfer label being constructed according to the teachings of the present invention and being represented generally by reference numeral 311.

Heat-transfer label 311 comprises a support portion 313, support portion 313 comprising a carrier 315 and a release layer 317. Carrier 315 is identical to carrier 15 of label 11, and release layer 317 is identical to release layer 17 of label 11.

Heat-transfer label 311 also comprises a wax layer 319, wax layer 319 overcoating release layer 317 of support portion 313. Wax layer 319 is identical to wax layer 219 of label 211 and preferably has a thickness of about 0.1 to 20 microns, more preferably about 1 to 15 microns.

Heat-transfer label 311 further comprises a transfer portion 321 (it being understood that, even though only a single transfer portion 321 is shown in FIG. 4, one need not position only one transfer portion 321 per support portion 313, but rather, one may space apart at regular intervals a plurality of identical or different transfer portions 321 on an elongated common web of support portion 313). Transfer portion 321 preferably includes (i) a heat-activatable adhesive layer 323 printed directly onto a desired area of wax layer 319; and (ii) an ink design layer 325 printed directly onto a desired area of adhesive layer 323 (the footprint of ink design layer 325 not exceeding that of adhesive layer 323).

Adhesive layer 323, which preferably has a thickness of about 10 to 200 microns, more preferably about 20 to 80 microns, has a melting point in the range of about 60 to 150° C., more preferably about 80 to 120° C., and is capable of bonding securely to fabrics. In addition, adhesive layer 323 has a sufficiently smooth top surface to enable the legible printing of ink design layer 325 thereonto. The present inventors have determined that, to obtain a desirably smooth top surface, the surface roughness of adhesive layer 323 preferably should not exceed more than about 15 microns. Accordingly, an example of a suitable adhesive composition comprises 450 parts HMP 5184 V polyester powder resin (Bostik-Findley, Middleton, Mass.) as an adhesive, 150 parts PKHW 35 phenoxy dispersion (InChem Corp., Rock Hill, S.C.) as a binder, 110 parts TAFIGEL PUR 61 thickener (Ultra Additives, Inc., Clover, S.C.), 12 parts DEHYDRAN 1620 defoamer (Cognis Corp., Ambler, Pa.), 6 parts ZONYL FSA wetting agent (DuPont, Wilmington, Del.), and 1800 parts water. Such a polyester-containing adhesive composition results in an adhesive layer having a surface roughness of about 6-10 microns. Another example of a suitable adhesive composition comprises 100 parts GEON 137 PVC resin (PolyOne, Avon Lake, Ohio), 55 parts, SANTICIZER 160 plasticizer (Ferro, Cleveland, Ohio) and 55 parts dioctyl phthalate plasticizer (ChemCentral, Bedford Park, Ill.). Such a PVC-containing adhesive composition has been found to yield an adhesive layer having a surface roughness of less than 1 micron. Because the PVC-containing adhesive layer produced by the latter composition yields a smoother top surface than does the polyester-containing adhesive layer produced by the former composition, said PVC-containing adhesive layer is better for printing images and lettering of small size or requiring high resolution. In addition, the above-described PVC-containing adhesive layer appears to be more resistant to cracking, following repeated washing cycles, than the above-described polyester-containing adhesive layer.

Adhesive layer 323 is preferably formed by depositing, by screen printing, gravure printing, flexographic printing or the like, onto wax layer 319 an adhesive composition of the type described above and then evaporating the volatile component(s) of the composition leaving only the non-volatile solid component(s) thereof to form layer 323.

Ink design layer 325 of transfer portion 321 may actually comprise either a single ink layer or a plurality of ink layers. In order to maintain the structural integrity of the transferred label, ink design layer 325 must be compatible with adhesive layer 323 and may be similar in composition thereto. Particularly where adhesive layer 323 is a PVC-containing adhesive layer, ink design layer 325 is preferably formed using a PVC-based ink. An example of a suitable PVC-containing ink composition for use in making ink design layer 325 comprises 720 parts GEON 137 PVC resin (PolyOne Corporation, Avon Lake, Ohio), 350 parts SANTICIZER 160 plasticizer (Ferro, Cleveland, Ohio), 350 parts dioctyl phthalate plasticizer (ChemCentral, Bedford Park, Ill.), 140.4 parts VIOLET PC colorant (PolyOne Corporation, Avon Lake, Ohio), 77.4 parts BLUE PC colorant (PolyOne Corporation, Avon Lake, Ohio) and 25.2 parts BRIGHT YELLOW PC colorant (PolyOne Corporation, Avon Lake, Ohio). As can readily be seen, such an ink composition is very similar in composition to the above-described PVC adhesive composition, and ink design layer 325 itself bonds to the fabric or other item to which label 311 is applied.

Ink design layer 325, which preferably has a thickness of about 0.1 to 30 microns, more preferably about 1 to 20 microns, is formed in the conventional manner by depositing, preferably by screen printing, one or more ink compositions of the type described above onto one or more desired areas of adhesive layer 323 and, thereafter, allowing any volatile component(s) of the ink composition(s) to evaporate, leaving only the non-volatile ink components to form layer 325. In the case of the above-described PVC-containing ink, there are no such volatile components, but the printed layer must be heated, typically in an IR or UV oven, to fuse or "cure" the layer.

As can readily be appreciated, depending upon the particular use to which the label is put, ink design layer 325 may include indicia for a permanent care label, an institutional ID, an individual ID, etc. In addition, as will be described below in further detail, ink design layer 325 and/or adhesive layer 323 could additionally or alternatively include a "watermark" or could include a marking printed with pigments activatable by irradiation with particular wavelengths of light or with heat to enable the screening of labeled articles for product security, such as counterfeit detection.

Label 311 may be used in the same manner as label 211. One advantage of label 311 over label 211 is that label 311 does not require a primer layer. As a result, the manufacturing process for producing label 311 is less involved than that for producing label 211, thereby resulting in a reduction of materials needed and in manufacturing time and expense. In addition, because label 311 does not require a primer layer, its transfer portion has a reduced thickness or bulk as compared to that of label 211, making the transfer portion of label 311 less irritating to the skin of a wearer of a labeled garment.

Another advantage of label 311 over label 211, where the transfer portions of both labels are PVC-based, is that label 311 does not require that the polyvinyl chloride resin in the ink design layer be cross-linked since the placement of the ink layer above the adhesive layer, instead of below the adhesive layer, is sufficient to prevent diffusion of the ink within the ink layer during heat transfer. This is significant because the cross-linking of the PVC resin tends to adversely affect the softness of the label. In other words, a non-cross-linked PVC layer is softer to the touch and less irritating to the skin of a wearer than a cross-linked PVC layer. As a result, label 311 results in a labeled garment that feels softer and is less irritating to a wearer.

Figure 5:
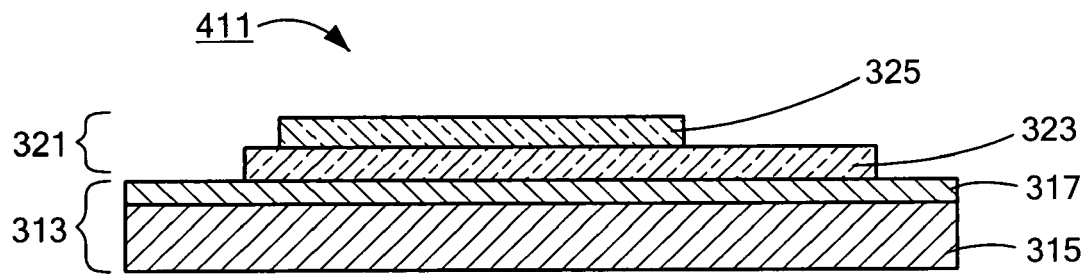
FIG. 5 is a schematic section view of a fifth embodiment of a heat-transfer label well-suited for use in labeling articles of fabric.

Referring now to FIG. 5, there is shown a schematic section view of a fifth embodiment of a heat-transfer label well-suited for use in labeling articles of fabric, said heat-transfer label being constructed according to the teachings of the present invention and being represented generally by reference numeral 411.

Heat-transfer label 411 is very similar to heat-transfer label 311, the only difference between the two labels being that label 411 does not include a layer corresponding to wax layer 319 of label 311.

Figure 6:
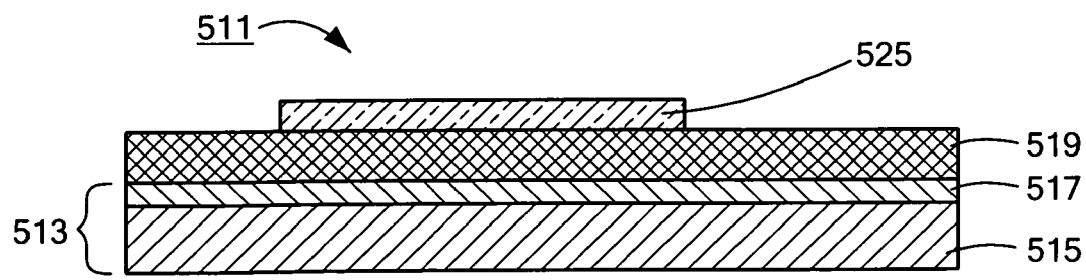
FIG. 6 is a schematic section view of a sixth embodiment of a heat-transfer label well-suited for use in labeling articles of fabric.

Referring now to FIG. 6, there is shown a schematic section view of a sixth embodiment of a heat-transfer label well-suited for use in labeling articles of fabric, said heat-transfer label being constructed according to the teachings of the present invention and being represented generally by reference numeral 511.

Heat-transfer label 511 comprises a support portion 513, support portion 513 comprising a carrier 515 and a release layer 517. Carrier 515 is identical to carrier 15 of label 11, and release layer 517 is identical to release layer 17 of label 11.

Heat-transfer label 511 also comprises a wax layer 519, wax layer 519 overcoating release layer 517 of support portion 513. Wax layer 519 is identical to wax layer 219 of label 211 and preferably has a thickness of about 4 to 20 microns, more preferably about 4 to 15 microns.

Heat-transfer label 511 further comprises an ink design layer 525 printed directly onto a desired area of wax layer 519 (it being understood that, even though only a single ink design layer 525 is shown in FIG. 6, one need not position only one transfer portion 525 per support portion 513, but rather, one may space apart at regular intervals a plurality of identical or different ink design layers 525 on an elongated common web of support portion 513).

Ink design layer 525 may actually comprise either a single ink layer or a plurality of ink layers. Preferably, ink design layer 525 is formed using a non-cross-linked PVC-based ink. An example of a suitable non-cross-linked PVC-containing ink composition for use in making ink design layer 525 comprises 720 parts GEON 137 PVC resin (PolyOne Corporation, Avon Lake, Ohio), 350 parts SANTICIZER 160 plasticizer (Ferro, Cleveland, Ohio), 350 parts dioctyl phthalate plasticizer (ChemCentral, Bedford Park, Ill.), 140.4 parts VIOLET PC colorant (PolyOne Corporation, Avon Lake, Ohio), 77.4 parts BLUE PC colorant (PolyOne Corporation, Avon Lake, Ohio) and 25.2 parts BRIGHT YELLOW PC colorant (PolyOne Corporation, Avon Lake, Ohio).

Ink design layer 525, which preferably has a thickness of about 0.1 to 50 microns, more preferably about 1 to 30 microns, is formed in the conventional manner by depositing, preferably by screen printing, one or more ink compositions of the type described above onto one or more desired areas of wax layer 519 and, thereafter, allowing any volatile component(s) of the ink composition(s) to evaporate, leaving only the non-volatile ink components to form layer 525. In the case of the above-described PVC-containing ink, there are no such volatile components, but the printed layer must be heated, typically in an IR or UV oven, to fuse or "cure" the layer.

As can readily be appreciated, depending upon the particular use to which the label is put, ink design layer 525 may include indicia for a permanent care label, an institutional ID, an individual ID, etc. In addition, as will be described below in further detail, ink design layer 525 could additionally or alternatively include a "watermark" or could include a marking printed with pigments activatable by irradiation with particular wavelengths of light or with heat to enable the screening of labeled articles for product security, such as counterfeit detection.

Label 511 may be applied to an article in the same manner as label 311. One advantage of label 511 over label 311 is that label 511 does not require an adhesive layer. As a result, the manufacturing process for producing label 511 is less involved than that for producing label 311, thereby resulting in a reduction of materials needed and in manufacturing time and expense. In addition, because label 511 does not require an adhesive layer, its transfer portion has a reduced thickness or bulk as compared to that of label 311, making the transfer portion of label 511 less irritating to the skin of a wearer of a labeled garment.

On the other hand, a disadvantage of label 511 relative to label 311 is that the lack of an adhesive layer below ink design layer 525 tends to cause the ink of ink design layer 525 to diffuse during label transfer. As a result, the resolution of the image of ink design layer 525 tends to be poorer than that of ink design layer 325. Consequently, ink design layer 525 is not as well suited as ink design layer 325 for printing images or lettering of small size.

Figure 7:
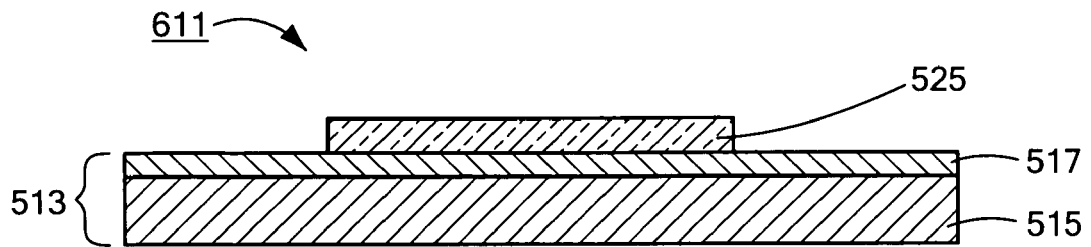
FIG. 7 is a schematic section view of a seventh embodiment of a heat-transfer label well-suited for use in labeling articles of fabric.

Referring now to FIG. 7, there is shown a schematic section view of a seventh embodiment of a heat-transfer label well-suited for use in labeling articles of fabric, said heat-transfer label being constructed according to the teachings of the present invention and being represented generally by reference numeral 611.

Heat-transfer label 611 is very similar to heat-transfer label 511, the only difference between the two labels being that label 511 does not include a layer corresponding to wax layer 519 of label 511.

Heat-transfer label 611 may be applied to an article in the same manner as heat-transfer label 511.

Figure 8:
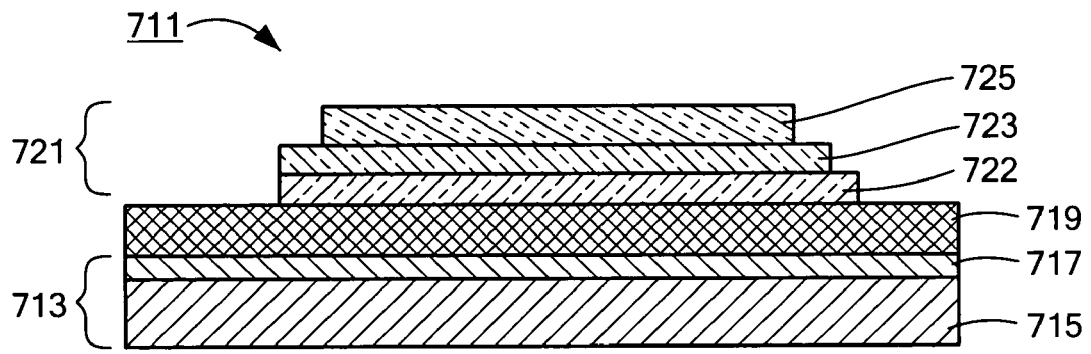
FIG. 8 is a schematic section view of an eighth embodiment of a heat-transfer label well-suited for use in labeling articles of fabric.

Referring now to FIG. 8, there is shown a schematic section view of a eighth embodiment of a heat-transfer label well-suited for use in labeling articles of fabric, said heat-transfer label being constructed according to the teachings of the present invention and being represented generally by reference numeral 711.

Label 711 comprises a support portion 713, support portion 713 comprising a carrier 715 and a release layer 717. Carrier 715 is identical to carrier 15 of label 11, and release layer 717 is identical to release layer 17 of label 11.

Heat-transfer label 711 also comprises a wax layer 719, wax layer 719 overcoating release layer 717 of support portion 713. Wax layer 719 is identical to wax layer 219 of label 211 and preferably has a thickness of about 4 to 20 microns, more preferably about 4 to 15 microns.

Heat-transfer label 711 further comprises a transfer portion 721 (it being understood that, even though only a single transfer portion 721 is shown in FIG. 8, one need not position only one transfer portion 721 per support portion 713, but rather, one may space apart at regular intervals a plurality of identical or different transfer portions 721 on an elongated common web of support portion 713). Transfer portion 721 preferably includes (i) a stretch layer 722 printed directly onto a desired area of wax layer 719; (ii) a heat-activatable adhesive layer 723 printed directly onto a desired area of stretch layer 722 (the footprint of adhesive layer 723 not exceeding that of stretch layer 722); and (iii) an ink design layer 725 printed directly onto a desired area of adhesive layer 723 (the footprint of ink design layer 725 not exceeding that of adhesive layer 723).

Stretch layer 722, which endows transfer portion 721 with a certain degree of elasticity (in order to permit transfer portion 721 to withstand better the stretching of fabric to which portion 721 is secured), preferably has a thickness of about 5 to 100 microns, more preferably about 10 to 80 microns. Preferably, stretch layer 722 comprises at least one of a polyester block copolymer, such as HYTREL polyester block copolymer (DuPont, Wilmington, Del.), a polyurea polymer, and a polyurethane polymer, such as ESTANE polyurethane polymer (Noveon, Cleveland, Ohio), Sancure (Noveon, Cleveland, Ohio) or NEOREZ polyurethane polymer (NeoResins, Wilmington, Mass.). An example of a suitable composition that may be used to produce stretch layer 722 comprises 50 parts SANCURE 835 (Noveon, Cleveland, Ohio), 2 parts TAFIGEL PUR 61 thickener (Ultra Additives, Inc., Clover, S.C.) and 0.2 parts DEHYDRAN 1620 defoamer (Cognis Corp., Ambler, Pa.).

Stretch layer 722 is preferably formed by depositing, by screen printing, gravure printing, flexographic printing or the like, onto wax layer 719 a stretch composition of the type described above and then evaporating the volatile component(s) of the composition leaving only the non-volatile solid component(s) thereof to form layer 722.

As discussed below in connection with another embodiment, stretch layer 722 may be modified to include a security feature, such as an RFID marker or a marking made with an activatable ink.

Adhesive layer 723 is identical to adhesive layer 323 of label 311.

Ink design layer 725 of transfer portion 721 may actually comprise either a single ink layer or a plurality of ink layers. In order to maintain the structural integrity of the transferred label, ink design layer 725 must be compatible with adhesive layer 723 and may be similar in composition thereto. Particularly where adhesive layer 723 is a PVC-containing adhesive layer, ink design layer 725 is preferably formed using a PVC-based ink. An example of a suitable PVC-containing ink composition for use in making ink design layer 725 comprises 40.6 parts Geon GEON 137 PVC resin (PolyOne Corporation, Avon Lake, Ohio), 22.3 parts SANTICIZER 160 plasticizer (Ferro, Cleveland, Ohio), 22.3 parts dioctyl phthalate plasticizer (ChemCentral, Bedford Park, Ill.), 5.5 parts VIOLET PC colorant (PolyOne Corporation, Avon Lake, Ohio), 4.4 parts LIGHT BROWN PC colorant (PolyOne Corporation, Avon Lake, Ohio) and 4.1 parts BRIGHT BLUE PC colorant (PolyOne Corporation, Avon Lake, Ohio).

Ink design layer 725, which preferably has a thickness of about 0.1 to 30 microns, more preferably about 1 to 20 microns, is formed in the conventional manner by depositing, preferably by screen printing, one or more ink compositions of the type described above onto one or more desired areas of adhesive layer 723 and, thereafter, allowing any volatile component(s) of the ink composition(s) to evaporate, leaving only the non-volatile ink components to form layer 725. In the case of the above-described PVC-containing ink, there are no such volatile components, but the printed layer must be heated, typically in an IR or UV oven, to fuse or "cure" the layer.

As can readily be appreciated, depending upon the particular use to which the label is put, ink design layer 725 may include indicia for a permanent care label, an institutional ID, an individual ID, etc. In addition, as will be described below in further detail, at least one of the layers of transfer portion 721 (i.e., ink design layer 725, adhesive layer 723, stretch layer 722) could additionally or alternatively include a "watermark" or could include a marking printed with pigments activatable by irradiation with particular wavelengths of light or with heat to enable the screening of labeled articles for product security, such as counterfeit detection.

Label 711 may be applied to an article in the same manner as label 311.

Figure 9:
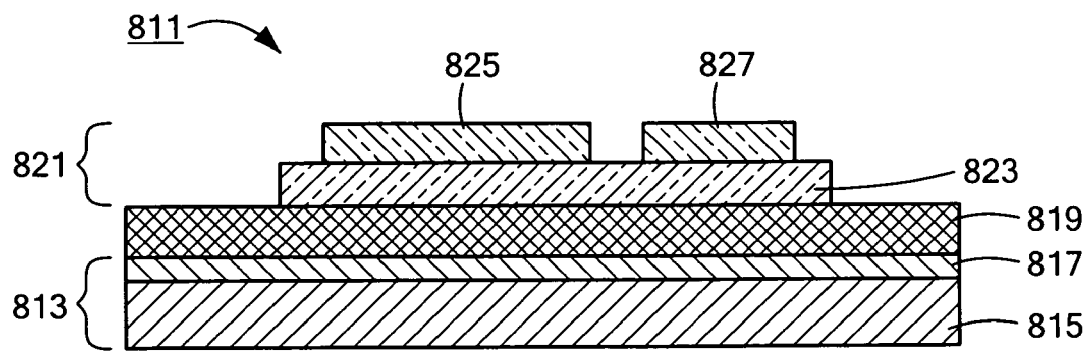
FIG. 9 is a schematic section view of a ninth embodiment of a heat-transfer label well-suited for use in labeling articles of fabric.

Referring now to FIG. 9, there is shown a schematic section view of a ninth embodiment of a heat-transfer label well-suited for use in labeling articles of fabric, said heat-transfer label being constructed according to the teachings of the present invention and being represented generally by reference numeral 811.

Heat-transfer label 811 comprises a support portion 813, support portion 813 comprising a carrier 815 and a release layer 817. Carrier 815 is identical to carrier 315 of label 311, and release layer 817 is identical to release layer 317 of label 311.

Heat-transfer label 811 also comprises a wax layer 819, wax layer 819 being identical to wax layer 319 and overcoating release layer 817 of support portion 813.

Heat-transfer label 811 further comprises a transfer portion 821 (it being understood that, even though only a single transfer portion 821 is shown in FIG. 9, one need not position only one transfer portion 821 per support portion 813, but rather, one may space apart at regular intervals a plurality of identical or different transfer portions 821 on an elongated common web of support portion 813). Transfer portion 821 comprises an adhesive layer 823 printed directly on wax layer 819 and an ink design layer 825 printed directly on adhesive layer 823, adhesive layer 823 being identical to adhesive layer 323 of label 311 and ink design layer 825 being identical to adhesive layer 325 of label 311. It should be noted that ink design layer 825 is not co-extensive with adhesive layer 823. As a result, one or more areas or "windows" of adhesive layer 823 are exposed or left uncovered by ink design layer 825.

Heat-transfer label 811 additionally comprises a marking 827, marking 827 being printed on one of the aforementioned windows of adhesive layer 823 not covered by ink design layer 825. (Although ink design layer 825 and marking 827 are shown and described herein as separate elements on adhesive layer 823, it can readily be appreciated that they function together to produce a unitary design on adhesive layer 823.)

As can readily be appreciated, label 811 could include a plurality of markings like marking 827. Moreover, ink design layer 825 could be omitted entirely from label 811, with marking 827 containing whatever information, image, etc. one wishes to have depicted in label 811.

It is presently envisioned that ink design layer 825 be used to convey information that is constant for a plurality of transfer portions 821 and that marking 827 be used to convey information that may vary from transfer portion 821 to transfer portions 821. For example, ink design layer 825 may be used to convey care instructions or a trademark for an article of clothing whereas marking 827 may be used to convey information that is particular to a given label, or to a series of labels. The marking 827 may contain human-readable information and/or machine-readable information, such as bar codes. Examples of information that may be included in variable marking 827 include: (a) serial numbers uniquely identifying each label; (b) product characteristics, such as the size of each such article of clothing (e.g., S, M, L, etc.), style, fiber type, etc.; (c) pricing information; (d) identification or location of the manufacturer or distributor; and (e) authenticity information. Alternatively, ink design layer 825 may be omitted, and marking 827 may be used to convey both the fixed information typically conveyed by ink design layer 825 and the variable information described above.

Typically, ink design layer 825 is applied by the label manufacturer, and marking 827 is applied thereafter by an industrial user of the label (sometimes called a label converter; for example, a clothing manufacturer) just prior to label transfer. In this manner, custom labels may be produced, and the amount of label stock that must be kept on hand by the manufacturer can be significantly decreased. More generally, however, the ink design layer 825 can be imprinted in-line with the marking 827; the marking 827 can be imprinted at the same location but different printing line used to form the ink design layer 825; or the ink design layer 825 and marking 827 can be imprinted at different locations, typically by different manufacturers.

Preferably, marking 827 is formed using a variable printing technique, i.e., thermal transfer printing (preferably a near-edge thermal transfer printer), ink jet printing, laser printing, or the like, so that a custom label can be created as needed. (Marking 827 could also be made by other printing techniques, such as gravure printing, screen printing, and flexographic printing, but these techniques do not lend themselves as easily to the printing of variable information.) As can readily be appreciated, a thermal transfer printer, an ink jet printer, a laser printer or like device may be connected to a computer in such a manner that a digital image generated by or selected using the computer may be printed with the printer. Such a computer could be a stand-alone personal computer or could be a computer connected to a network through a mainframe, through the Internet, etc.

As noted above in connection with label 311, the legibility of matter printed on adhesive layer 823 is largely a function of the surface roughness of adhesive layer 823. Consequently, if the printing surface of adhesive layer 823 has a surface roughness of greater than about 15 microns, the print quality tends to be rather poor. (This problem of legibility is exacerbated where thermal transfer printing or the like is used to print the marking since the thickness of a marking made by such techniques is on the order of 1 micron.) Therefore, the surface roughness of adhesive layer 823 is preferably no greater than about 10 microns and is more preferably about 5 microns if one wishes to print graphics (as opposed to text) or text of small lettering. Accordingly, for applications where high resolution is required, the PVC-based adhesive described above in connection with label 311 is preferably used, said PVC-based adhesive having a surface roughness of less than 1 micron. By contrast, where such high resolution is not required, the polyester-based adhesive described above in connection with label 311 may alternatively be used, said polyester-based adhesive having a surface roughness of about 6-10 microns.

It should also be noted that, where thermal transfer printing is used to make marking 827, it has been found that ink transfer ribbons that are resin-based produce markings of better resolution than do ink transfer ribbons that are resin and wax-based whereas ink transfer ribbons that are resin and wax-based produce markings of better contrast ratio (i.e., darkness of color) than do ink transfer ribbons that are resin-based. Therefore, depending upon whether better resolution or better contrast is desired, one can choose an appropriate ink transfer ribbon.

Although marking 827 has been described herein as being positioned in a window of adhesive layer 823, one could align marking 827 with a portion or all of ink design layer 825, for example, to form an authenticity certificate or the like.

Label 811 may be applied to an article in the same manner as label 311.

In a similar fashion to that described above in label 811, label 711 also may include a marking (preferably made by thermal transfer printing, ink jet printing, laser printing or the like), such a marking being printed directly on adhesive layer 723.

Figure 10:
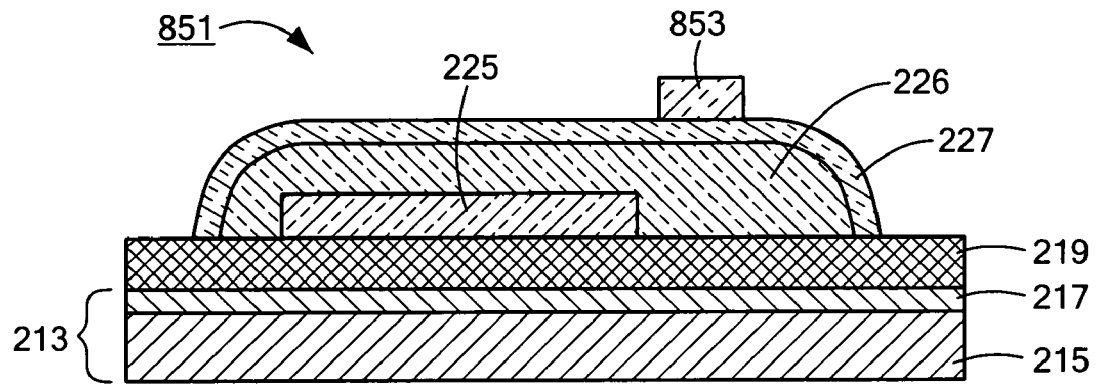
FIG. 10 is a schematic section view of a tenth embodiment of a heat-transfer label well-suited for use in labeling articles of fabric.

Referring now to FIG. 10, there is shown a schematic section view of a tenth embodiment of a heat-transfer label well-suited for use in labeling articles of fabric, said heat-transfer label being constructed according to the teachings of the present invention and being represented generally by reference numeral 851.

Heat-transfer label 851 is similar in most respects to heat-transfer label 211, the principal difference between the two labels being that heat-transfer label 851 additionally includes a marking 853 printed directly on adhesive layer 227 in an area aligned with an open area of ink design layer 225. Marking 853 is preferably formed in the same manner as marking 827 of label 811.

As can readily be appreciated, label 851 could include a plurality of markings like marking 853. Moreover, ink design layer 225 could be omitted entirely from label 851, with marking 853 containing whatever information, image, etc. one wishes to have depicted in label 851.

Furthermore, although marking 853 has been described herein as being aligned with an open area of ink design layer 225, one could align marking 853 with a portion or all of ink design layer 225, for example, to form an authenticity certificate or the like.

Label 851 may be applied to an article in the same manner as label 211.

As can readily be appreciated, it may be desirable to incorporate into heat-transfer labels of the type described above security features (e.g., anti-theft, anti-counterfeit, anti-parallel imports, etc.), features for tracking inventory or the like. In accordance with the teachings of the present invention, one approach to accomplishing this objective is to incorporate an RFID (radio frequency identification) device into the heat-transfer label. The RFID device may contain information for security purposes and/or a wide variety of other types of information. Examples of information that may be included in an RFID device include: (a) serial numbers uniquely identifying each RFID label; (b) product characteristics, such as the size of each such article of clothing (e.g., S, M, L), style, fiber type, etc.; (c) pricing information; (d) identification or location of the manufacturer or distributor; and (e) authenticity information.

Figure 11:
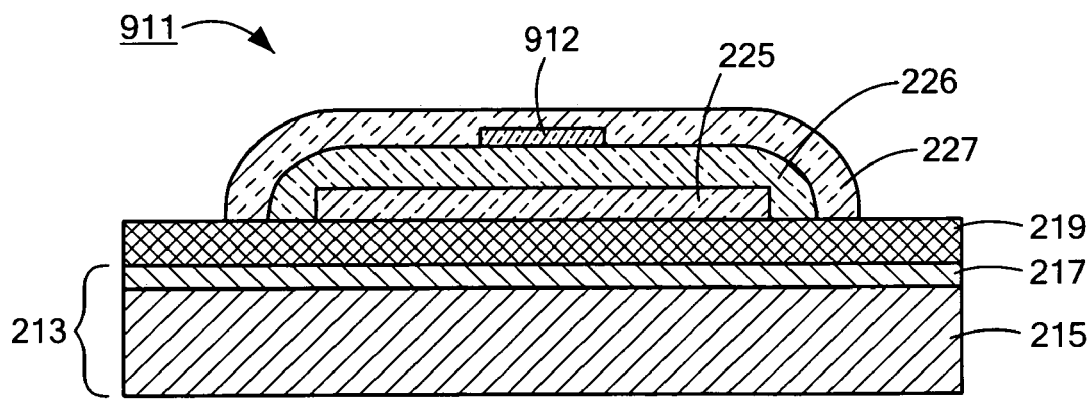
FIG. 11 is a schematic section view of an eleventh embodiment of a heat-transfer label well-suited for use in labeling articles of fabric.

Referring now to FIG. 11, there is shown a schematic section view of a eleventh embodiment of a heat-transfer label well-suited for use in labeling articles of fabric, said heat-transfer label being constructed according to the teachings of the present invention and being represented generally by reference numeral 911.

Heat-transfer label 911 is similar in most respects to label 211, the principal difference between the two labels being that label 911 additionally includes an RFID integrated circuit having a built-in antenna 912, RFID integrated circuit 912 being sandwiched between primer layer 226 and adhesive layer 227. Preferably, RFID integrated circuit 912 is very thin to reduce the bulk of label 911. An example of an RFID integrated circuit with a built-in antenna suitable for use as RFID integrated circuit 912 is commercially available from Hitachi, Ltd. as the "mu-chip" RFID IC. The "mu-chip" RFID IC has a size of 0.4 mm×0.4 mm, operates at a radio frequency 2.45 Ghz and has a 128-bit ROM. The mounting of RFID integrated circuit 912 between primer layer 226 and adhesive layer 227 may be accomplished by depositing RFID integrated circuit 912 onto primer layer 226 (before primer layer 226 has dried) and then printing adhesive layer 227 over RFID integrated circuit 912 and primer layer 226.

Label 911 may be applied to an article in the same manner as label 211.

Figure 12:
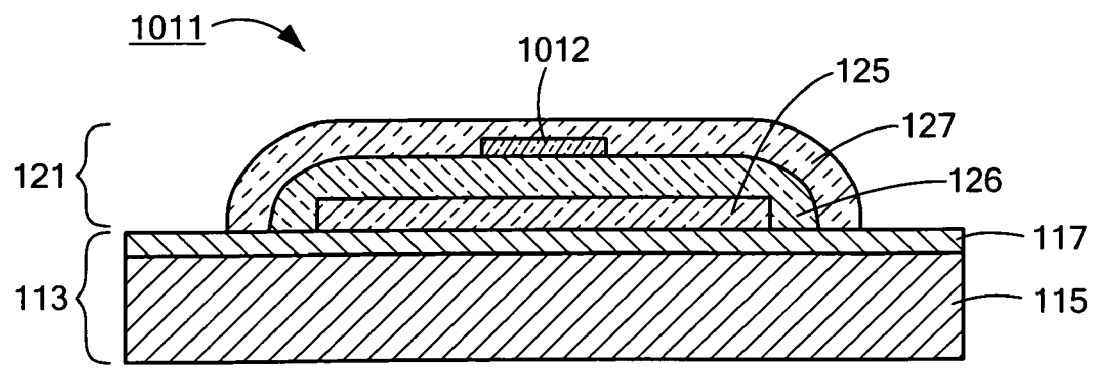
FIG. 12 is a schematic section view of a twelfth embodiment of a heat-transfer label well-suited for use in labeling articles of fabric.

Another embodiment of a heat-transfer label that additionally includes an RFID integrated circuit having a built-in antenna is shown in FIG. 12, said heat-transfer label being constructed according to the teachings of the present invention and being represented generally by reference numeral 1011. Heat-transfer label 1011, which is similar in most respects to label 111, differs from label 111 in that label 1011 additionally includes an RFID integrated circuit 1012 disposed between adhesive layer 127 and primer layer 126, RFID integrated circuit 1012 being identical to RFID integrated circuit 912.

Although not shown, it should be understood that an RFID integrated circuit like RFID integrated circuit 912 or RFID integrated circuit 1012 may be inserted in like fashion into heat-transfer label 11. Alternatively, an RFID IC like RFID IC 912 or RFID IC 1012 may be inserted between the ink design and adhesive layers of each of labels 311, 411 and 711.

Figure 13:
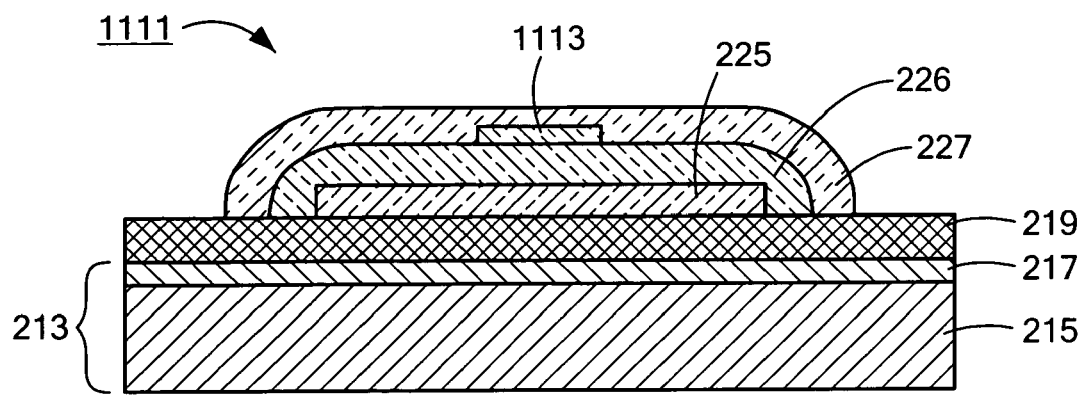
FIG. 13 is a schematic section view of a thirteenth embodiment of a heat-transfer label well-suited for use in labeling articles of fabric.

Referring now to FIG. 13, there is shown a schematic section view of a thirteenth embodiment of a heat-transfer label well-suited for use in labeling articles of fabric, said heat-transfer label being constructed according to the teachings of the present invention and being represented generally by reference numeral 1111.

Heat-transfer label 1111 is similar in most respects to label 911, the principal difference between the two labels being that label 1111 includes, instead of RFID IC 912, an RFID strap 1113 inserted between adhesive layer 227 and primer layer 226. An "RFID strap" comprises the combination of an RFID chip and conductive leads. Examples of RFID straps are disclosed in the following patents and patent applications, all of which are incorporated herein by reference: U.S. Patent Application Publication No. 2003/0136503 entitled RFID LABEL TECHNIQUE, inventors Green et al., published Jul. 24, 2003; U.S. patent application Ser. No. 10/214,066 entitled RADIO FREQUENCY IDENTIFICATION DEVICE AND METHOD, inventor Liu et al., filed Aug. 7, 2002; U.S. patent application Ser. No. 10/406,702 entitled RFID DEVICE DETECTION SYSTEM AND METHOD, inventor Forster, filed Apr. 3, 2003; U.S. Patent Application Ser. No. 60/485,313 entitled RFID DEVICE WITH CHANGEABLE CHARACTERISTICS, inventors Forster et al., filed Jul. 7, 2003; and U.S. Patent Application Ser. No. 60/517,155 entitled RFID TAG WITH ENHANCED READABILITY, inventor Forster, filed Nov. 4, 2003. In addition, an RFID strap is commercially available from Philips Electronics (Netherlands) as the "I-connect" RFID strap.

Label 1111 may be applied to an article in the same manner as label 911.

Although not shown, it should be understood that an RFID strap like RFID strap 1113 may be inserted in like fashion into heat-transfer label 11. Alternatively, an RFID strap like RFID strap 1113 may be inserted between the ink design and adhesive layers of each of labels 311, 411 and 711.

It should be noted that the read distance of wireless RFIDs and of RFID straps is quite small, i.e., about an inch. Accordingly, the RFID information in labels 911, 1011, and 1111 can only be read when a reader is positioned very close thereto. To enable reading at longer distances, the RFID device preferably includes an antenna.

Figure 14:
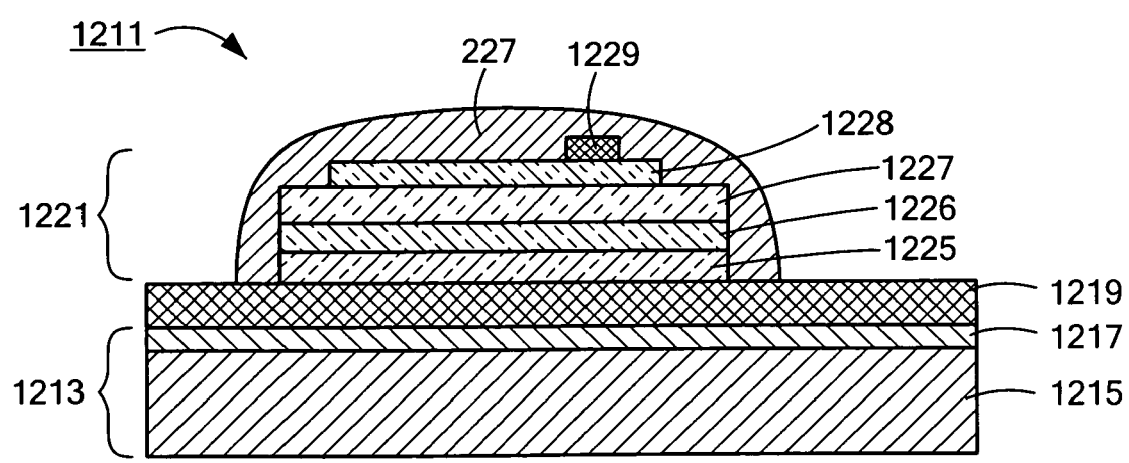
FIG. 14 is a schematic section view of a fourteenth embodiment of a heat-transfer label well-suited for use in labeling articles of fabric.

Referring now to FIG. 14, there is shown a schematic section view of a fourteenth embodiment of a heat-transfer label well-suited for use in labeling articles of fabric, said heat-transfer label being constructed according to the teachings of the present invention and being represented generally by reference numeral 1211.

Heat-transfer label 1211 comprises a support portion 1213, support portion 1213 comprising a carrier 1215 and a release layer 1217. Carrier 1215 is identical to carrier 15 of label 11, and release layer 1217 is identical to release layer 17 of label 11.

Heat-transfer label 1211 also comprises a wax layer 1219 overcoating release layer 1217 of support portion 1213, wax layer 1219 being identical to wax layer 219.

Heat-transfer label 1211 further comprises a transfer portion 1221 (it being understood that, even though only a single transfer portion 1221 is shown in FIG. 14, one need not position only one transfer portion 1221 per support portion 1213, but rather, one may space apart at regular intervals a plurality of identical or different transfer portions 1221 on an elongated common web of support portion 1213). Transfer portion 1221 includes (i) an ink design layer 1225 printed directly onto a desired area of wax layer 1219, ink design layer 1225 preferably being identical to ink design layer 225 of label 211, (ii) a mask layer 1226 printed directly onto ink design layer 1225 (as well as onto any exposed areas of wax layer 1219 within ink design layer 1225) and onto a surrounding area of wax layer 1219, mask layer 1226 preferably being similar to ink design layer 225 of label 211 but having an opaquing quality to obscure from view, after label transfer, the RFID device to be described below, (iii) a primer layer 1227 printed directly onto mask layer 1226, primer layer 1227 preferably being identical to primer layer 226 of label 211; (iv) an antenna 1228 printed directly onto primer layer 1227, antenna 1228 being printed with silver ink using standard printing techniques, such as screen printing or flexographic printing; (v) an RFID chip 1229 bonded to antenna 1228 using conventional chip-attaching techniques and common bonding adhesives, such as anisotropic conductive paste or film; and (vi) a heat-activatable adhesive layer 227 printed directly over RFID chip 1229, any exposed areas of antenna 1228 and primer 1227, and a surrounding area of wax layer 1219.

Label 1211 may be applied to an article in the same manner as label 1111.

Figure 15:
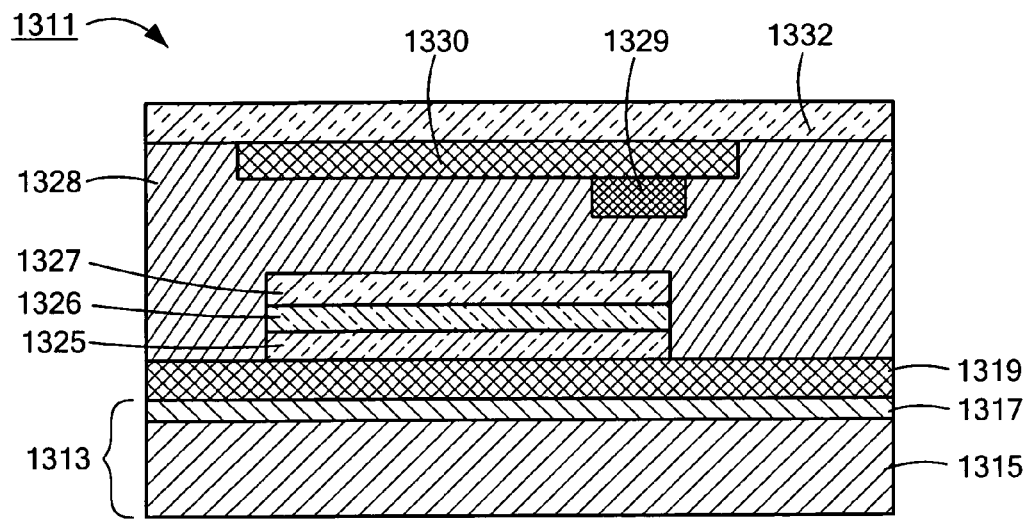
FIG. 15 is a schematic section view of a fifteenth embodiment of a heat-transfer label well-suited for use in labeling articles of fabric.

Referring now to FIG. 15, there is shown a schematic section view of a fifteenth embodiment of a heat-transfer label well-suited for use in labeling articles of fabric, said heat-transfer label being constructed according to the teachings of the present invention and being represented generally by reference numeral 1311.

Heat-transfer label 1311 comprises a support portion 1313, support portion 1313 comprising a carrier 1315 and a release layer 1317. Carrier 1315 is identical to carrier 15 of label 11, and release layer 1317 is identical to release layer 17 of label 11.

Heat-transfer label 1311 also comprises a wax layer 1319 overcoating release layer 1317 of support portion 1313, wax layer 1319 being identical to wax layer 219.

Heat-transfer label 1311 further comprises a transfer portion 1321 (it being understood that, even though only a single transfer portion 1321 is shown in FIG. 15, one need not position only one transfer portion 1321 per support portion 1313, but rather, one may space apart at regular intervals a plurality of identical or different transfer portions 1321 on an elongated common web of support portion 1313). Transfer portion 1321 includes an ink design layer 1325 printed directly onto a desired area of wax layer 1319, ink design layer 1325 preferably being identical to ink design layer 225 of label 211.

Transfer portion 1321 also includes a mask layer 1326, mask layer 1326 being printed directly onto ink design layer 1325 (as well as onto any exposed areas of wax layer 1319 within ink design layer 1325) and onto a surrounding area of wax layer 1319. Mask layer 1326 preferably is similar to ink design layer 225 of label 211 but has an opaquing quality to obscure from view, after label transfer, the RFID device to be described below.

Transfer portion 1321 additionally includes a primer layer 1327 printed directly onto mask layer 1326, primer layer 1327 preferably being identical to primer layer 226 of label 211.

Figure 16:
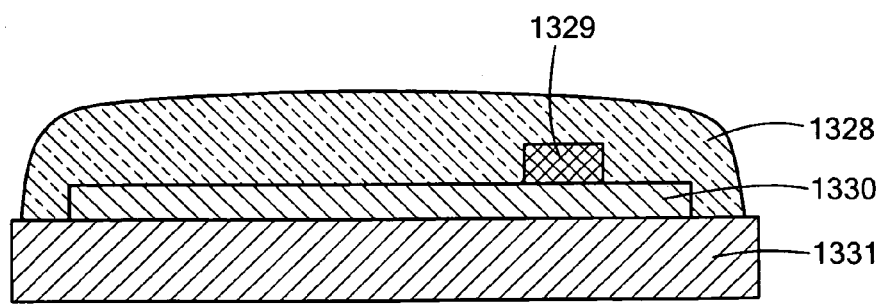
FIG. 16 is a schematic section view of the sub-combination used to prepare the heat-transfer label of FIG. 15.

Transfer portion 1321 further includes the sub-combination of a pressure-sensitive adhesive 1328, an RFID chip 1329 and an antenna 1330, said sub-combination being formed as follows (see FIG. 16): First, antenna 1330 is printed on a release liner 1331 using silver ink and a conventional antenna printing technique. Next, RFID chip 1329 is attached to antenna 1330 using a conventional chip bonding technique. Then, pressure-sensitive adhesive 1328 is printed over antenna 1330 and chip 1329 and onto release liner 1331. Thus formed, said sub-combination is inverted, and pressure-sensitive adhesive 1328 is brought into contact with primer layer 1327. Next, release liner 1331 is removed from antenna 1330 and pressure-sensitive adhesive 1328. Lastly, a heat-activatable adhesive 1332 is printed directly onto the thus exposed antenna 1330 and pressure-sensitive adhesive 1328, as well as onto a surrounding area of wax layer 1319.

Label 1311 may be applied to an article in the same manner as label 1211.

Because of privacy issues, it may be desirable for the RFID device to become inoperable soon after the sale to a consumer of the garment to which the RFID device has been attached. One way to cause the inoperability of the RFID device is to print the RFID antenna using a water-soluble ink. In this manner, when the garment is washed, the antenna will dissolve, rendering the RFID device inoperable. Another approach is to use a water-soluble adhesive in the area retaining the RFID device in the label (but not in the area retaining the graphics of the label). In this manner, when the garment is washed, the adhesive will dissolve, and the RFID device will be washed away from the label.

Another way in which the various heat-transfer labels described above may be endowed with a security feature (anti-theft, anti-counterfeiting, anti-parallel imports) or with an inventory control mechanism is to incorporate one or more security materials (such as inks and additives) into the label. Security materials may comprise, or be added to, a single layer of the label (such as an ink layer or adhesive layer), or may comprise multiple layers of the label which interact to provide a security indication. Readily apparent (or "overt") security indicators are generally preferred to covert security.

Security inks include, but are not limited to, IR-activatable inks, UV-activatable inks, visible light-activatable inks, heat-activatable inks, electrically-activatable inks, magnetically-activatable inks, chemically-activatable inks, humidity-activatable inks, pressure-activatable inks, dichroic inks, time-controlled inks.

Security additives include, for example, microscopic tracer particles (or "taggants") that may be incorporated into, e.g., the adhesive layer of the heat-transfer label. Certain molecules can be coded by their physical material composition, color, alpha-numeric characters and other methods. An electronic reader would be used to verify the molecular composition in the heat-transfer label.

Figure 17:
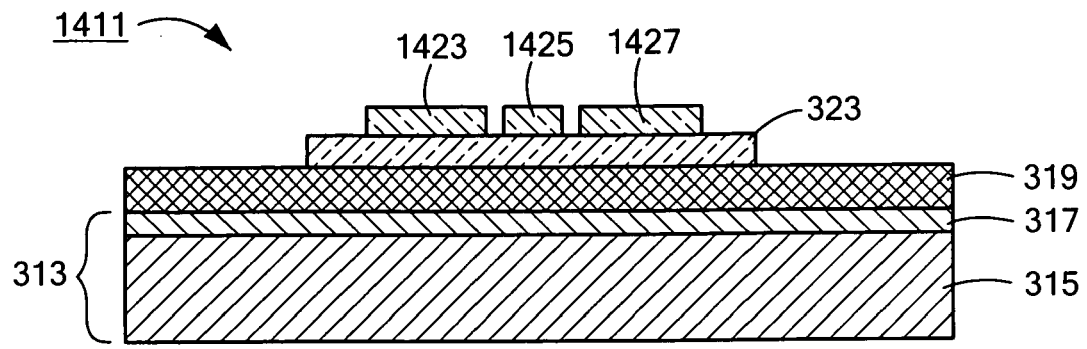
FIG. 17 is a schematic section view of a sixteenth embodiment of a heat-transfer label well-suited for use in labeling articles of fabric.

As an example of a security ink, referring to FIG. 17, there is shown a schematic section view of a sixteenth embodiment of a heat-transfer label well-suited for use in labeling articles of fabric, said heat-transfer label being constructed according to the teachings of the present invention and being represented generally by reference numeral 1411.

Heat-transfer label 1411 is similar in most respects to heat-transfer label 311, the principal difference between the two labels being that label 1411 includes, instead of ink layer 325, an ink layer comprising a conventional ink design 1423, a thermochromic ink design 1425 and a marking 1427. Conventional ink design 1423 may be printed on adhesive layer 323 in the same manner and using the same types of inks as ink layer 325. Thermochromic ink design 1425 may be printed on adhesive layer 323 in a similar fashion as conventional ink design 1423, except that a thermochromic ink is used instead of a non-thermochromic ink. Thermochromic ink design 1425 may be used as a security feature, such as an authenticity certificate in the form of a product logo. When subjected to heat (e.g., using a hand-held heater), the appearance of the product logo changes color, thereby signaling to a party that the product is authentic or authorized for sale. An example of a thermochromic ink suitable for use in printing ink layer 1425 is commercially available from Matsui International (Gardena, Calif.) as CHROMICOLOR FAST BLUE ink.

Marking 1427 may be printed on adhesive layer 323 in the same manner and using the same types of inks as marking 827 and may be used to depict the same type of information as marking 827, such as variable printing information.

Label 1411 may be applied to an article in the same manner as label 311.

Figure 18:
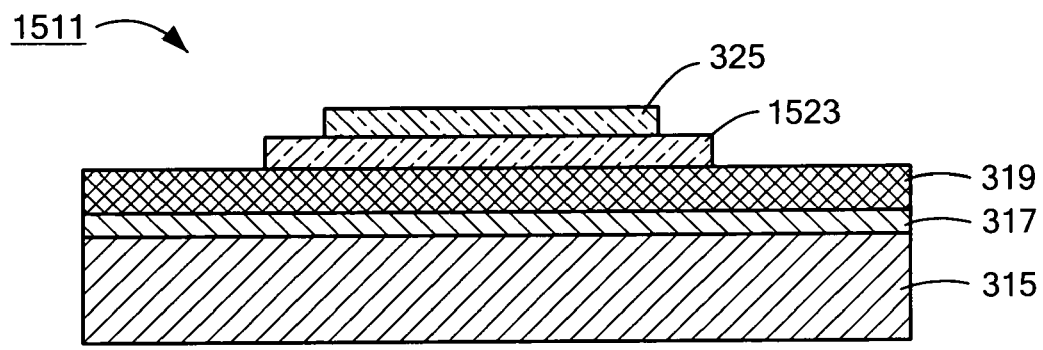
FIG. 18 is a schematic section view of a seventeenth embodiment of a heat-transfer label well-suited for use in labeling articles of fabric.

Referring now to FIG. 18, there is shown a schematic section view of a seventeenth embodiment of a heat-transfer label well-suited for use in labeling articles of fabric, said heat-transfer label being constructed according to the teachings of the present invention and being represented generally by reference numeral 1511.

Label 1511 is similar in most respects to label 311, the principal difference between the two labels being that label 1511 includes an adhesive layer 1523, instead of adhesive layer 323. Adhesive layer 1523 differs from layer 323 in that it additionally includes a light-activated pigment. Consequently, layer 1523 functions as a security (e.g. anti-counterfeit) layer by emitting light of a signature color when activated by light of a particular wavelength. An example of an adhesive composition suitable for use in making layer 1523 includes 100 parts GEON 137 PVC resin (PolyOne, Cleveland, Ohio), 55 parts SANTICIZER 160 plasticizer (Ferro, Cleveland, Ohio), 55 parts dioctyl phthalate (ChemCentral, Bedford Park, Ill.) and 21 parts LUMINOVA BG-300M phosphorescent pigment (UMC, Lyndhurst, N.J.).

Alternatively, one may replace adhesive layer 1523 with an ink layer printed from PHOTOPIA PURPLE UV sensitive ink (Matsui International, Gardena, Calif.).

Label 1511 may be applied to an article in the same manner as label 311.

Figure 19:
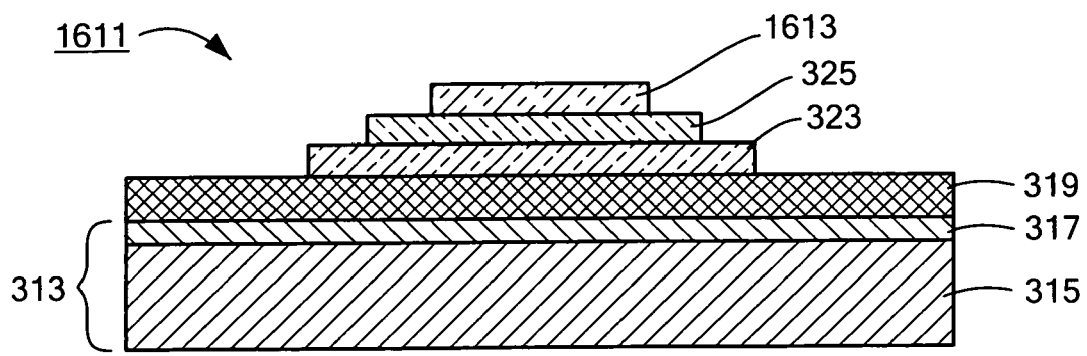
FIG. 19 is a schematic section view of an eighteenth embodiment of a heat-transfer label well-suited for use in labeling articles of fabric.

Referring now to FIG. 19, there is shown a schematic section view of an eighteenth embodiment of a heat-transfer label well-suited for use in labeling articles of fabric, said heat-transfer label being constructed according to the teachings of the present invention and being represented generally by reference numeral 1611.

Heat-transfer label 1611 is similar in many respects to heat-transfer label 311, the principal difference between the two labels being that label 1611 additionally includes a second ink design layer 1613 printed directly onto ink design layer 325, layers 1613 and 325 being selected so that their areas of overlap are distinctive (e.g., in color) from their areas of non-overlap. For example, layer 325 may include yellow horizontal stripes and layer 1613 may include blue vertical stripes; consequently, where the yellow and blue stripes intersect, areas of green will appear. It is presently envisioned that layer 325 will be printed at a first location by the label manufacturer and that layer 1613 will be printed at a second location by the garment manufacturer (label converter) using a thermal transfer printer, ink jet printer, laser printer or the like. In this manner, the label converter can selectively "activate" the label.

It should be understood that layers 1613 and 325 may be formulated to undergo a chemical reaction when overlapped with one another, instead of interacting in the manner described above to cause a physical color change.

Label 1611 may be applied to an article in the same manner as label 311.

Figure 20:
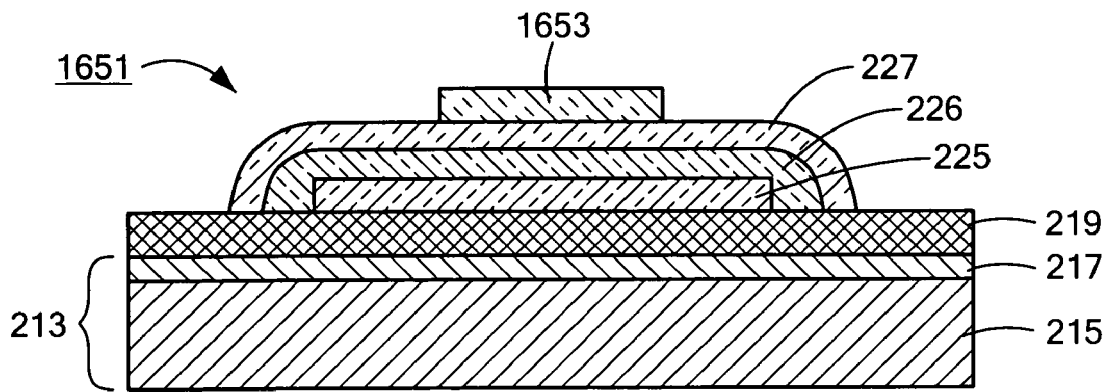
FIG. 20 is a schematic section view of a nineteenth embodiment of a heat-transfer label well-suited for use in labeling articles of fabric.

Referring now to FIG. 20, there is shown a schematic section view of a nineteenth embodiment of a heat-transfer label well-suited for use in labeling articles of fabric, said heat-transfer label being constructed according to the teachings of the present invention and being represented generally by reference numeral 1651.

Heat-transfer label 1651 is similar in many respects to heat-transfer label 211, the principal difference between the two labels being that label 1651 additionally includes a second ink design layer 1653 printed directly onto adhesive layer 227, layers 1653 and 225 being selected so that their areas of overlap are distinctive (e.g., in color) from their areas of non-overlap. For example, layer 225 may include yellow horizontal stripes and layer 1653 may include blue vertical stripes; consequently, where the yellow and blue stripes intersect, areas of green will appear. It is presently envisioned that layer 225 will be printed at a first location by the label manufacturer and that layer 1653 will be printed at a second location by the garment manufacturer using a thermal transfer printer, ink jet printer, laser printer or the like. In this manner, the manufacturer can selectively "activate" the label.

Label 1651 may be applied to an article in the same manner as label 211.

Figure 21:
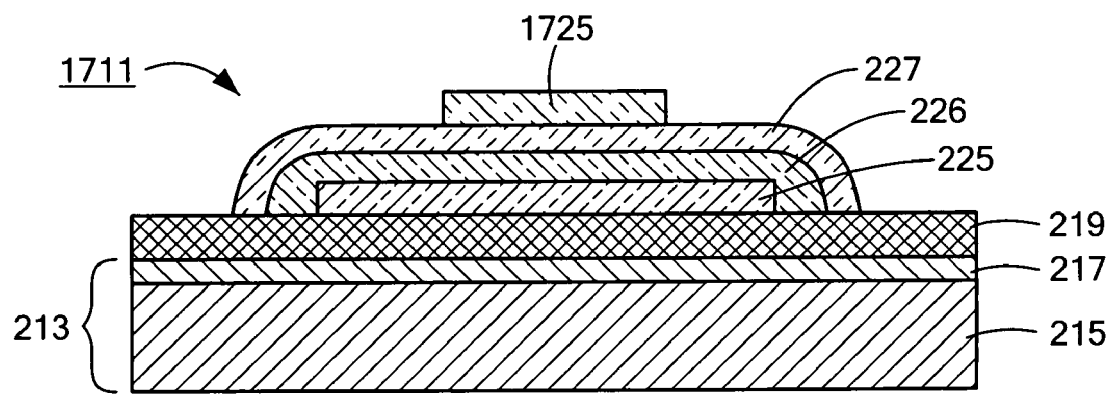
FIG. 21 is a schematic section view of a twentieth embodiment of a heat-transfer label well-suited for use in labeling articles of fabric.

Referring now to FIG. 21, there is shown a schematic section view of a twentieth embodiment of a heat-transfer label well-suited for use in labeling articles of fabric, said heat-transfer label being constructed according to the teachings of the present invention and being represented generally by reference numeral 1711.

Heat-transfer label 1711 is similar in most respects to label 211, the principal difference between the two labels being that label 1711 additionally includes an ink design layer 1725 printed directly onto adhesive layer 227. Ink design layer 1725, which is preferably made by thermal transfer printing or a similar digital printing technique, includes an image in which digital codes encoding information are embedded therein as fixed position pixels in the matrix of image pixels. The digital codes are inconspicuous to the naked eye but can be read by a digital reader programmed to detect the embedded digital codes.

Heat-transfer label 1711 may be applied to an article in the same manner as label 211.

Figure 22:
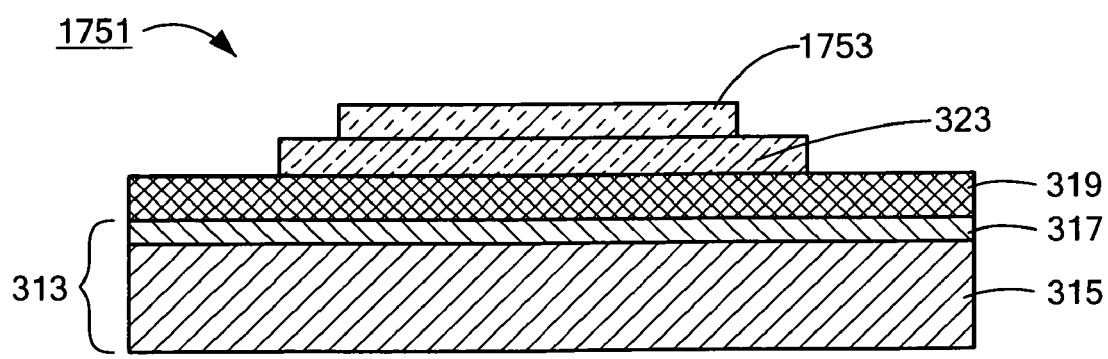
FIG. 22 is a schematic section view of a twenty-first embodiment of a heat-transfer label well-suited for use in labeling articles of fabric.

Referring now to FIG. 22, there is shown a schematic section view of a twenty-first embodiment of a heat-transfer label well-suited for use in labeling articles of fabric, said heat-transfer label being constructed according to the teachings of the present invention and being represented generally by reference numeral 1751.

Heat-transfer label 1751 is similar in most respects to label 311, the principal difference between the two labels being that label 1751 includes an ink design layer 1753, preferably made by thermal transfer printing or a similar digital printing technique, to include an image in which digital codes encoding information are embedded therein as fixed position pixels in the matrix of image pixels. The digital codes are inconspicuous to the naked eye but can be read by a digital reader programmed to detect the embedded digital codes.

Heat-transfer label 1751 may be applied to an article in the same manner as label 311.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A heat-transfer label suitable for labeling fabric comprising:
   (a) a support portion; and
   (b) a transfer portion, said transfer portion being positioned over said support portion for transfer of the transfer portion from the support portion to an article of fabric under conditions of heat and pressure, said transfer portion comprising
      (i) an ink design layer, said ink design layer comprising a thermochromic ink design; and
      (ii) a heat-activatable adhesive layer, said heat-activatable adhesive layer having a thickness of about 10 to 200 microns and having a surface roughness not exceeding about 10 microns;
      (iii) wherein said ink design layer is printed directly onto said heat-activatable adhesive layer, said heat-activatable adhesive layer being positioned between said ink design layer and said support portion, said ink design layer having a top surface opposite said heat-activatable adhesive layer, said top surface being exposed to permit its direct contact with a fabric to be labeled.

2. The heat-transfer label as claimed in claim 1 wherein said heat-activatable adhesive layer has a surface roughness not exceeding about 5 microns.

3. The heat-transfer label as claimed in claim 2 wherein said heat-activatable adhesive layer has a surface roughness less than 1 micron.

4. The heat-transfer label as claimed in claim 1 wherein said heat-activatable adhesive layer comprises one of a polyester adhesive resin, a polyamide resin, and a polyvinyl chloride adhesive resin.

5. The heat-transfer label as claimed in claim 4 wherein said heat-activatable adhesive layer comprises a polyester adhesive resin.

6. The heat-transfer label as claimed in claim 4 wherein said heat-activatable adhesive layer comprises a polyvinyl chloride adhesive resin.

7. The heat-transfer label as claimed in claim 1 wherein said ink design layer further comprises a marking made by one of thermal transfer printing, ink jet printing and laser printing.

8. The heat-transfer label as claimed in claim 7 wherein said marking is made by thermal transfer printing.

9. The heat-transfer label as claimed in claim 7 wherein said ink design layer further comprises a design comprising a non-cross-linked polyvinyl chloride ink.

10. The heat-transfer label as claimed in claim 1 wherein said heat-activatable adhesive layer has a thickness of about 200 microns.

11. The heat-transfer label as claimed in claim 1 wherein said heat-activatable adhesive layer has a thickness of about 20 to 80 microns.

12. The heat-transfer label as claimed in claim 11 wherein said heat-activatable adhesive layer has a thickness of about 80 microns.

13. The heat-transfer label as claimed in claim 1 wherein said support portion comprises a release coating and wherein said release coating is made of a non-wax, non-silicone, release material.

14. The heat-transfer label as claimed in claim 13 further comprising a wax layer positioned between said release coating and said transfer portion.

15. The heat-transfer label as claimed in claim 14 wherein said heat-activatable adhesive layer is in direct contact with said wax layer.

16. The heat-transfer label as claimed in claim 1 wherein each of said ink design layer and said heat-activatable adhesive layer has a periphery, the periphery of said ink design layer not exceeding the periphery of said heat-activatable adhesive layer.

17. The heat-transfer label as claimed in claim 1 wherein said ink design layer further comprises a first marking and a second marking, said first marking being made by one of thermal transfer printing, ink jet printing and laser printing, said second marking being made by screen printing.

* * * * *